United States Patent
Thompson et al.

(10) Patent No.: US 10,414,501 B2
(45) Date of Patent: Sep. 17, 2019

(54) SEAT BACK BREAKOVER WITH DYNAMICALLY TRIGGERED ACTUATOR

(71) Applicant: Rockwell Collins, Inc., Cedar Rapids, IA (US)

(72) Inventors: Jeff Thompson, Lewisville, NC (US); Jay Pierson, Lewisville, NC (US); Brad Barg, Advance, NC (US); Travis Finlay, Winston-Salem, NC (US); Thomas Martz, Winston-Salem, NC (US); Neng Yue, Lewisville, NC (US); Dennis Hedrick, Colfax, NC (US); Randy Penley, Lewisville, NC (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 204 days.

(21) Appl. No.: 15/610,167

(22) Filed: May 31, 2017

(65) Prior Publication Data
US 2018/0346125 A1    Dec. 6, 2018

(51) Int. Cl.
*B64D 11/06* (2006.01)

(52) U.S. Cl.
CPC ........ *B64D 11/0619* (2014.12); *B64D 11/064* (2014.12)

(58) Field of Classification Search
CPC ... B64D 11/064; B64D 11/0619; B64D 11/06; B60N 2/42745; B60N 2/4228; B60N 2/888
See application file for complete search history.

(56) References Cited

U.S. PATENT DOCUMENTS

| | | | | | |
|---|---|---|---|---|---|
| 3,441,313 | A | * | 4/1969 | Bror ..................... | B60N 2/22 297/374 |
| 4,394,047 | A | * | 7/1983 | Brunelle ................ | B60N 2/20 16/339 |
| 4,408,738 | A | * | 10/1983 | Mazelsky .............. | B64D 25/04 244/122 B |
| 4,641,884 | A | * | 2/1987 | Miyashita ............. | B60N 2/2252 297/284.1 |
| 5,145,233 | A | * | 9/1992 | Nagashima ........... | B60N 2/874 297/408 |
| 5,273,240 | A | * | 12/1993 | Sharon ................. | B60N 2/4242 188/271 |

(Continued)

*Primary Examiner* — James M Ference
(74) *Attorney, Agent, or Firm* — Clements Bernard Walker PLLC

(57) ABSTRACT

An aircraft passenger seat having a dynamic breakover assembly includes a seat bottom frame and a seat back pivotally-mounted to the seat bottom frame that allows the angle of the seat back relative to the seat bottom frame to be varied from an upright taxi takeoff and landing (TTOL) position to a reclined position. The seat may include a means for sensing acceleration corresponding to a force indicative of an abnormal event; and a breakover mechanism coupled to the seat bottom frame and the seat back in which the means for sensing acceleration is coupled to the breakover mechanism. The breakover mechanism can prevent movement of the seat back in a forward direction past the TTOL position during normal use, and permit forward movement of at least a portion of the seat back in the forward direction past the TTOL position upon activation by the means for sensing acceleration.

17 Claims, 20 Drawing Sheets

(56) References Cited

U.S. PATENT DOCUMENTS

| | | | | |
|---|---|---|---|---|
| 5,320,308 A * | 6/1994 | Bilezikjian | B60N 2/2227; 244/122 R |
| 5,340,059 A * | 8/1994 | Kanigowski | B64D 25/00; 244/118.5 |
| 5,454,622 A * | 10/1995 | Demopoulos | B60N 2/4221; 188/374 |
| 5,664,838 A * | 9/1997 | Baloche | B60N 2/12; 297/340 |
| 5,676,421 A * | 10/1997 | Brodsky | B60N 2/4214; 297/216.13 |
| 5,722,722 A * | 3/1998 | Massara | B60N 2/4228; 297/216.13 |
| 5,743,591 A * | 4/1998 | Tame | B60N 2/231; 297/216.1 |
| 5,788,185 A * | 8/1998 | Hooper | B64D 11/0619; 244/118.6 |
| 5,927,804 A * | 7/1999 | Cuevas | B60N 2/888; 297/216.12 |
| 6,019,424 A * | 2/2000 | Ruckert | B60N 2/2222; 297/216.12 |
| 6,074,004 A * | 6/2000 | Carmichael | B60N 2/4221; 297/216.13 |
| 6,312,050 B1 * | 11/2001 | Eklind | B60N 2/4221; 297/216.15 |
| 6,340,209 B1 * | 1/2002 | Yamamoto | B60R 22/26; 297/478 |
| 6,450,449 B1 * | 9/2002 | Podob | B64D 11/06; 244/118.5 |
| 6,470,746 B1 * | 10/2002 | Murayama | B60R 22/40; 297/480 |
| 6,478,256 B1 * | 11/2002 | Williamson | B60N 2/242; 244/122 R |
| 6,478,373 B1 * | 11/2002 | Hake | F16B 39/282; 297/216.13 |
| 7,159,937 B2 * | 1/2007 | Williamson | B60N 2/01508; 297/216.13 |
| 7,469,861 B2 * | 12/2008 | Ferry | B60N 2/206; 244/118.6 |
| 7,726,607 B2 * | 6/2010 | Schumacher | B60N 2/22; 244/122 R |
| 7,758,129 B2 * | 7/2010 | Maruno | B60N 2/015; 296/65.09 |
| 8,403,395 B2 * | 3/2013 | MacManus | B60N 2/4249; 296/68.1 |
| 8,668,263 B2 * | 3/2014 | Takayasu | B60N 2/888; 297/216.12 |
| 8,690,238 B2 * | 4/2014 | Orzelski | B60N 2/4228; 297/216.12 |
| 8,864,227 B2 * | 10/2014 | Funke | B64D 11/06; 297/216.13 |
| 2002/0195846 A1 * | 12/2002 | Masuda | B60N 2/853; 297/216.12 |
| 2003/0094542 A1 * | 5/2003 | Williamson | B60N 2/015; 244/122 R |
| 2003/0094837 A1 * | 5/2003 | Williamson | B60N 3/004; 297/163 |
| 2003/0094838 A1 * | 5/2003 | Williamson | B60N 2/682; 297/232 |
| 2003/0094840 A1 * | 5/2003 | Williamson | B64D 11/06; 297/248 |
| 2003/0094842 A1 * | 5/2003 | Williamson | B60N 2/015; 297/362.13 |
| 2004/0046430 A1 * | 3/2004 | Plant | B60N 3/002; 297/248 |
| 2005/0127740 A1 * | 6/2005 | Dowty | B64D 11/06; 297/487 |
| 2005/0140193 A1 * | 6/2005 | Skelly | A47C 7/503; 297/284.9 |
| 2005/0151405 A1 * | 7/2005 | Dowty | B60N 2/62; 297/317 |
| 2005/0253436 A1 * | 11/2005 | Dowty | B64D 11/06; 297/344.1 |
| 2006/0103191 A1 * | 5/2006 | De Wilde | B60N 2/427; 297/216.14 |
| 2007/0228794 A1 * | 10/2007 | Penley | B60N 2/2236; 297/354.1 |
| 2010/0308167 A1 * | 12/2010 | Hawkins | B60N 2/181; 244/122 R |
| 2018/0346125 A1 * | 12/2018 | Thompson | B64D 11/064 |

* cited by examiner

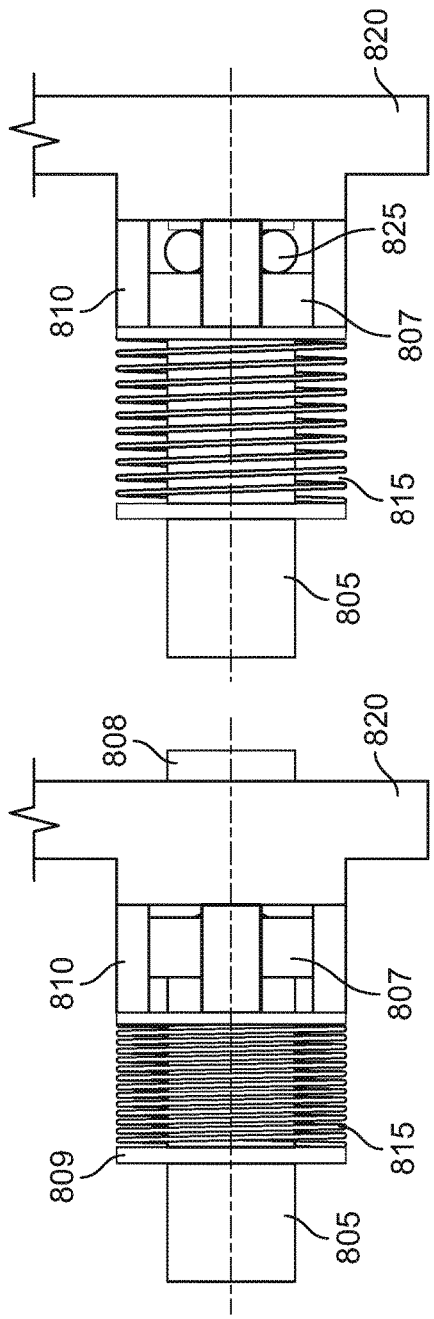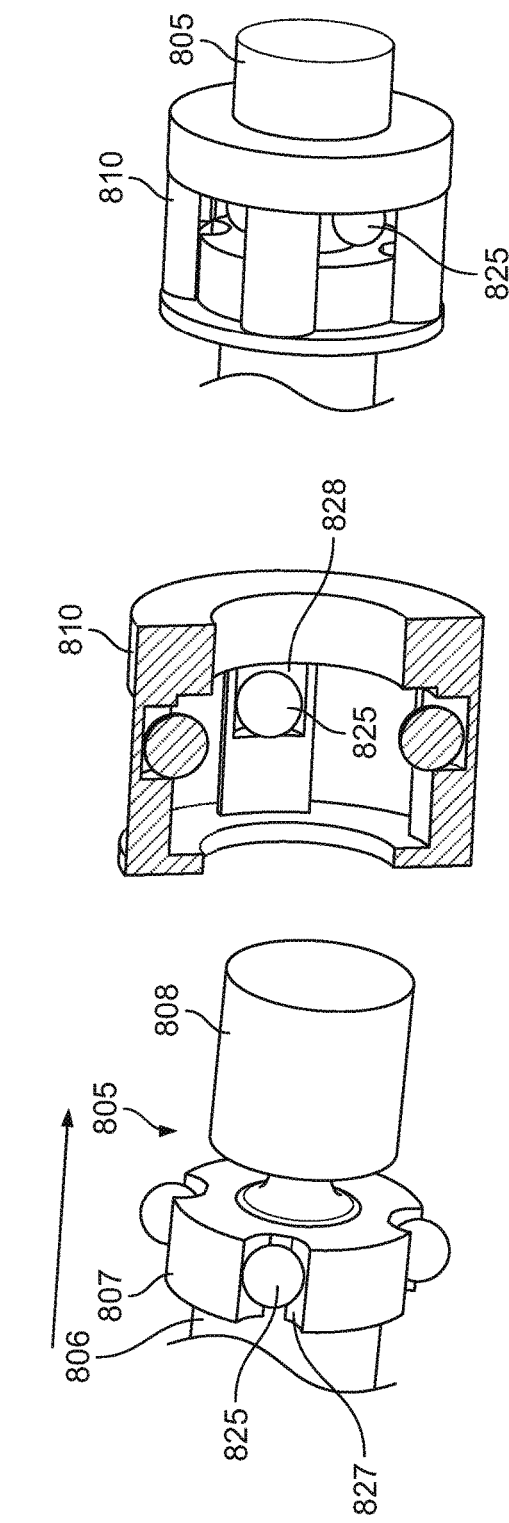

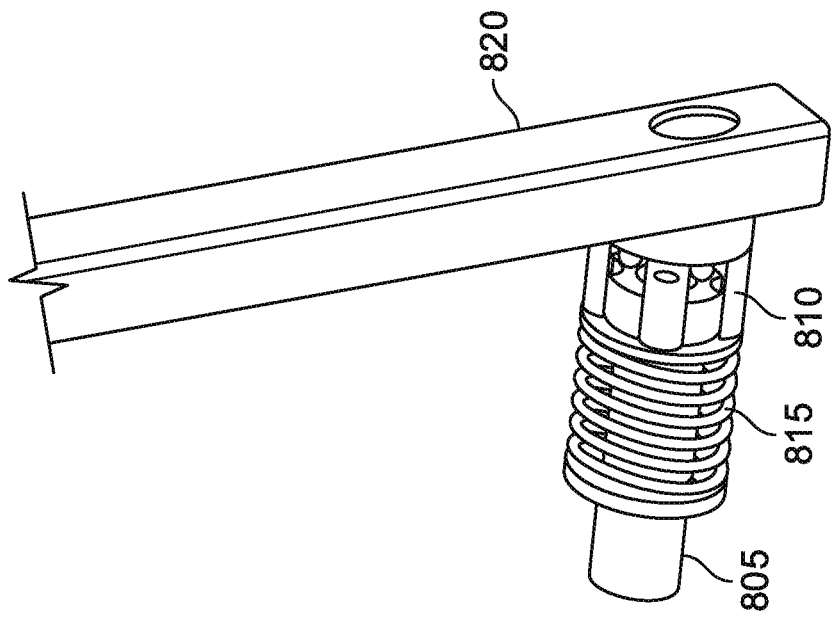
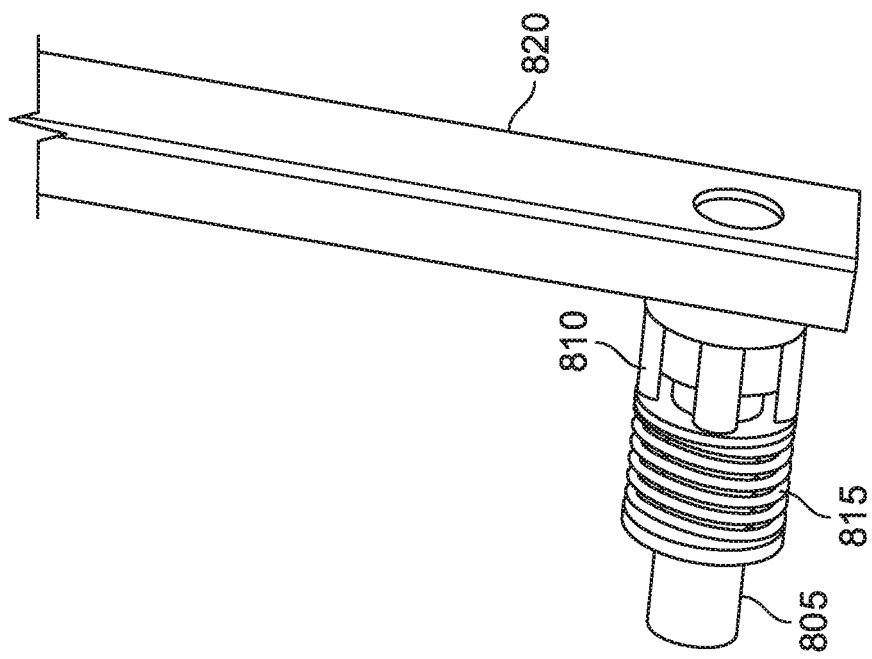

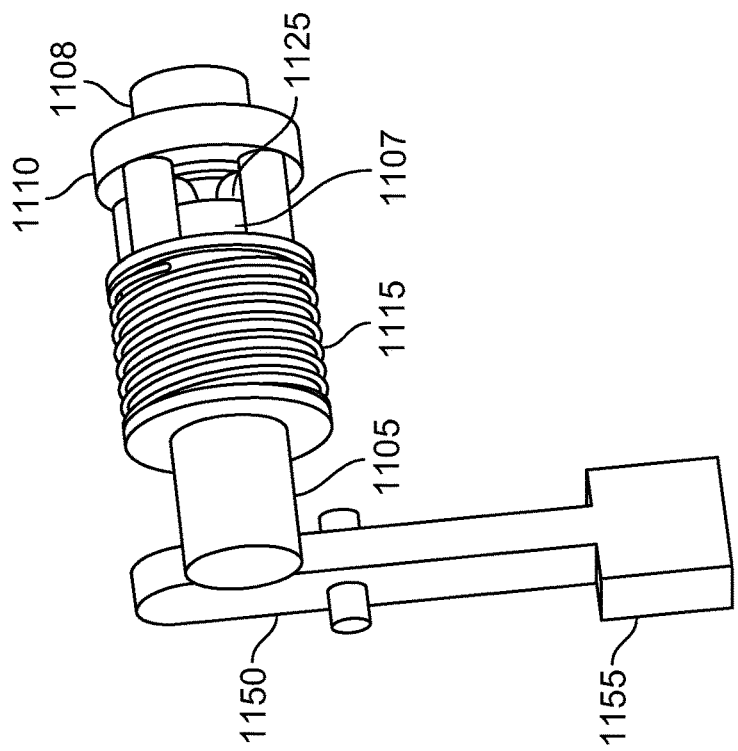
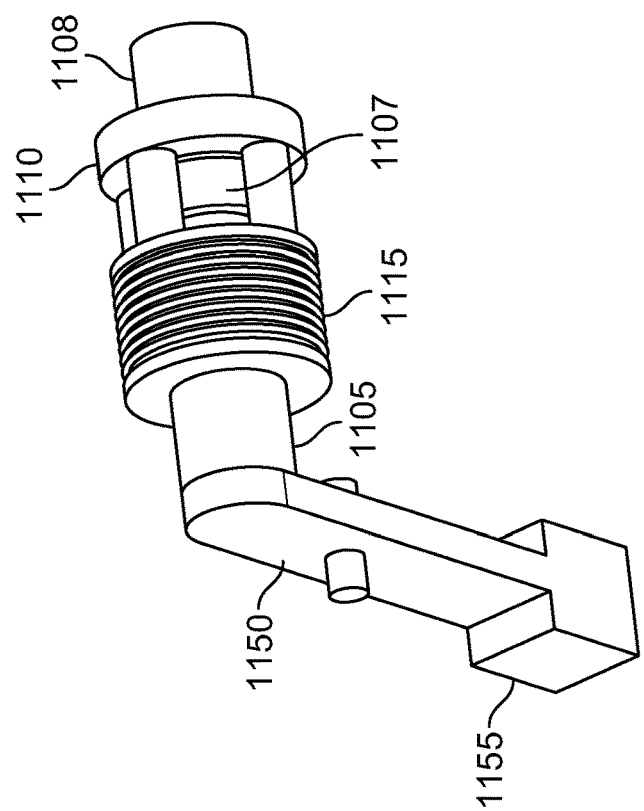
FIG. 11A
FIG. 11B

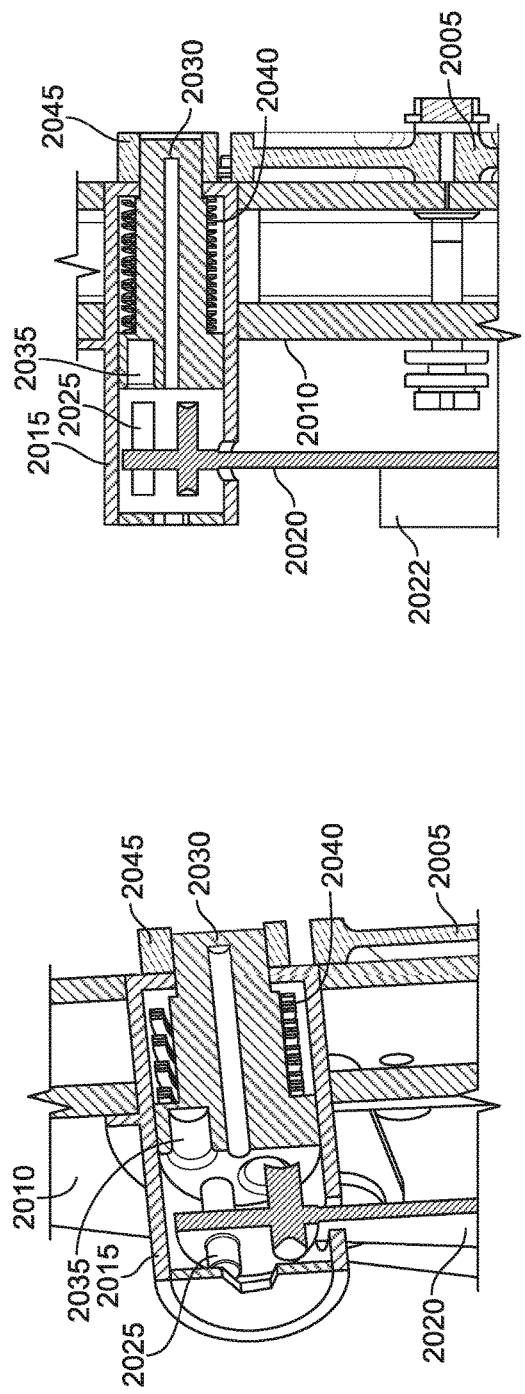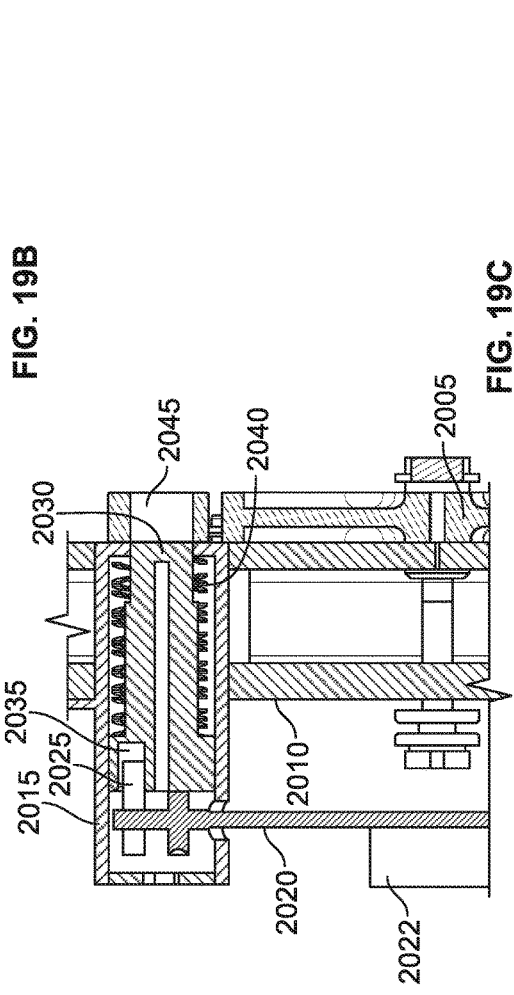
FIG. 19A
FIG. 19B
FIG. 19C

SEAT BACK BREAKOVER WITH DYNAMICALLY TRIGGERED ACTUATOR

RELATED APPLICATIONS

This application incorporates by reference, in their entirety, the following prior patent applications by B/E Aerospace, Inc. directed to deceleration event-triggered mechanisms: U.S. patent application Ser. No. 15/576,315, entitled "Pretensioner for Retractable Shoulder Belt and Seat Belt," filed Mar. 31, 2017, and U.S. Provisional Patent Application Ser. No. 62/481,244, entitled "Contoured Class Divider," filed Apr. 4, 2017.

BACKGROUND

The present disclosure relates to a passenger seat, or "seating unit," such as an aircraft passenger seat, with a dynamic breakover assembly.

Aircraft passenger seats must be designed and constructed according to government regulations and aircraft manufacturer specifications. Virtually every aspect of seat design is thus constrained by requirements imposed by safety, weight and cost considerations. Within these limits the seat must also be aesthetically pleasing, comfortable to a seated passenger, and functional for the passenger as well as airline maintenance, repair and cleaning crews.

Regulatory requirements for aircraft components in the US are based on Title 14 of the Code of Federal Regulations (CFR) Part 25, which sets out standards for aircraft airworthiness. For aircraft passenger seats, sections 25.561 and 25.562 of Title 14 specify requirements for seat structures that may give passengers a reasonable chance of escaping serious injury in a minor crash landing situation.

Main cabin or "coach" class seats are typically constructed with a seat bottom frame (bottom chassis) formed from two or more leg modules and section assembly modules joined together by several beam elements that connect the leg modules and section assembly modules in spaced-apart relation to each other, and collectively form a so-called "ladder frame assembly." A seat bottom unit is mounted on the ladder frame assembly. The seat bottom unit is usually stationary. A seat back unit is typically pivotally-mounted between two of the section assembly modules so that the angle of the seat back unit can be controlled for comfort, safety and passenger ingress and egress past the rear of the seat. Because of the relatively short pitch between rows of seats, the normal range of movement of the seat back unit is relatively small. The degree of rearward, recline movement is constrained by the position of the rearward row of seats and the requirement to leave the passenger seated behind a particular seat with sufficient room to enter and exit his or her own seat and use the meal tray. The degree of forward movement of the seat back unit is typically limited to a position where the seat back is in a "full upright" position for take-off and landings, and for meal service.

Passenger seats are typically designed whereby the seat back will not move beyond these positions under normal circumstances (including abuse loads). However, provision must also be made for the abnormal situation where severe G-force loads may propel a passenger forward toward the seat back directly in front of them. In such cases, the seat back must be allowed to fold over (breakover) the seat bottom in a controlled manner in order to minimize or reduce injury to a passenger who may be thrown against the seat back during an emergency deceleration (high G-force) event.

For aircraft passenger seats, 14 CFR § 25.562 requires that for a high G-force event (16 Gs), where head contact with seats or other structures may occur, some type of protection must be provided so that the so-called "Head Injury Criterion" (HIC) does not exceed 1000 units. 14 CFR 25.785 has a primary goal of protecting occupants from serious injury during landing condition, including injurious interactions of the head and neck (ref ANM-115-17-002). Conventional methods to generate a low HIC score typically involve either spacing passenger seats far enough apart so that a passenger's head will not make contact with the seat in front of him or her (severely limiting options for seating arrangements which increase the number of seats within the cabin), or building a breakover mechanism into the seat back. In breakover mechanism designs, breakover may occur when a passenger impacts the fore seatback using a force capable of breaking a weak or sacrificial component (e.g., breakable bushing part, shear pin, etc.), which was purposely built into the seat structure, allowing the seat back to begin to tilt forward upon impact. The movement of the seat back in response to a passenger impact may dissipate energy and lower the HIC score. However, these breakover mechanisms can also impact neck injury potential. For example, a reduction in HIC score may not always translate to a reduction of neck injury potential and can even increase the neck injury potential. Therefore, a proper balance in breakover design must be achieved in order to satisfy both requirements. In addition to the HIC score and neck injury potential, damage done to the seat back during a high G-force event must not prevent passenger egress or harm the passengers after an event. For example, the seat must stay largely intact and no sharp edges may occur. Furthermore, in some passenger seat configurations, there may also be neck injury criteria. As described above, the prior art breakover mechanisms typically require a passenger to make contact with the seat back to initiate the breakover.

SUMMARY OF ILLUSTRATIVE EMBODIMENTS

The forgoing general description of the illustrative implementations and the following detailed description thereof are merely exemplary aspects of the teachings of this disclosure, and are not restrictive.

In certain embodiments, an aircraft passenger seat having a dynamic breakover assembly can include a seat bottom frame and a seat back pivotally-mounted to the seat bottom frame that allows the angle of the seat back relative to the seat bottom frame to be varied from an upright taxi takeoff and landing (TTOL) position to a reclined position. The seat may include a means for sensing acceleration corresponding to a force indicative of an abnormal event; and a breakover mechanism coupled to the seat bottom frame and the seat back in which the means for sensing acceleration is coupled to the breakover mechanism. The breakover mechanism can prevent movement of the seat back in a forward direction past the TTOL position during normal use, and permit forward movement of at least a portion of the seat back in the forward direction past the TTOL position upon activation by the means for sensing acceleration.

In certain embodiments, the means for sensing acceleration may include acceleration sensor and drive circuitry that senses an emergency deceleration (high G-force) event and provides a drive current through a cable to an actuator that retracts a shaft, thereby uncoupling the seat back from the seat bottom and allowing forward movement of the seat back. In certain embodiments, the acceleration sensor may include any combination of multi-axis accelerometers, gyroscopes, and magnetometers. In some implementations, the actuator may be a linear solenoid. In other implementations, the means for sensing acceleration may include an inertial release assembly having a weighted end that may rotate in forward direction during a high G-force event, causing the seat back to become uncoupled from the seat bottom.

In some embodiments, acceleration sensor and drive circuitry may be centrally located amidst multiple seats or within the aircraft cabin and provide the drive current for multiple actuators. For example, acceleration sensor and drive circuitry may be located in or near a particular seat (or group of seats) for activating breakover in a designated section of passenger seats. In one example, the acceleration sensor and drive circuitry may be dedicated to a contiguous seating row (e.g., two or more seats positioned proximate each other and spanning from an aisle to a window). In another example, the acceleration sensor and drive circuitry may be dedicated to a passenger seating cluster (e.g., a grouping of passenger seats arranged between a fore monument or divider and an aft monument or divider).

Benefits of the embodiments described herein may include prevention or reduction of injuries to the passengers seated in the aircraft seats in situations where severe G-force loads may propel the passengers forward toward the seat back directly in front of them. The movement of the seat back due to the action of the breakover mechanism in response to a passenger impact during a high G-force event may dissipate energy and lower the Head Injury Criterion (HIC) score as well as reduce neck injury, egress, or harm potential, to ensure adherence to requirements delineated in 14 CFR § 25.785 without having to increase an amount of space between passenger seats.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 8A-8E illustrate various views of the hinge area and breakover mechanism of an aircraft passenger seat according to yet another embodiment of the present disclosure;

FIGS. 9A and 9B illustrate expanded perspective views of the hinge area and breakover mechanism of an aircraft passenger seat according to some embodiments of the present disclosure;

FIGS. 11A and 11B illustrate two views of another breakover mechanism of an aircraft passenger seat according to some embodiments of the present disclosure;

FIGS. 19A through 19C illustrate views of the hinge area and breakover mechanism of an aircraft passenger seat according to yet another embodiment of the present disclosure;

DETAILED DESCRIPTION OF ILLUSTRATIVE EMBODIMENTS

Figure 1A:
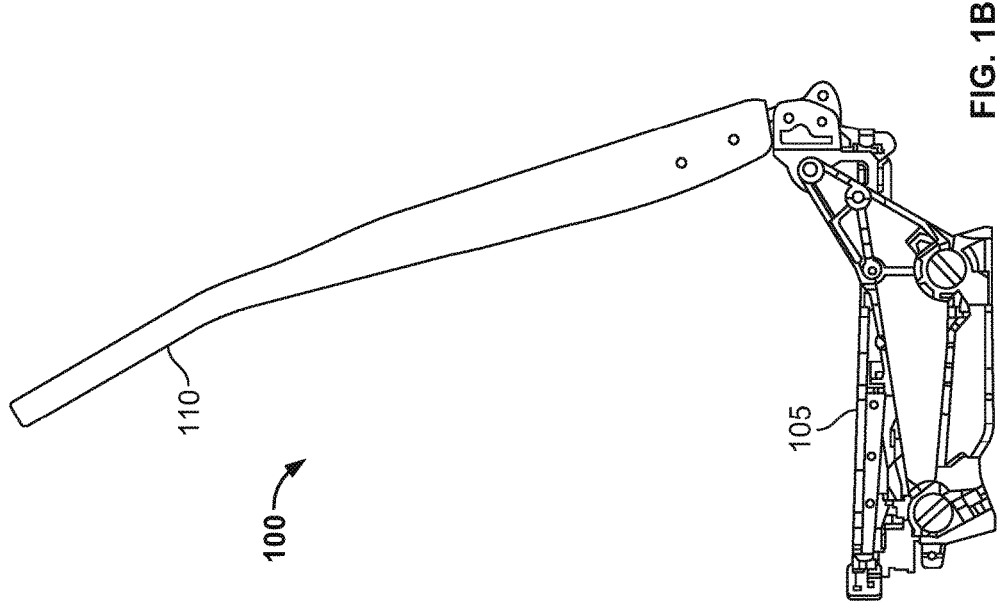
FIG. 1A illustrates an exemplary side elevation of the frame of an aircraft passenger seat with the seat back in the full upright position.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

As used herein, "normal" load refers to those loads which are normally applied to the seat back during normal use, and includes loads imposed by passengers pushing or leaning on the seat back unit during ingress and egress, and minor rear impacts such as may occur during moderately hard landings or "short" stops upon landing. As used herein, "abnormal" load refers to any load in excess of a normal load (as may happen during a high G-force event) and as specified in government regulations or aircraft manufacturer specifications. These requirements are well-known to all aircraft seat manufacturers. In general, such abnormal loads may be in the range of 16 Gs.

Figure 1B:
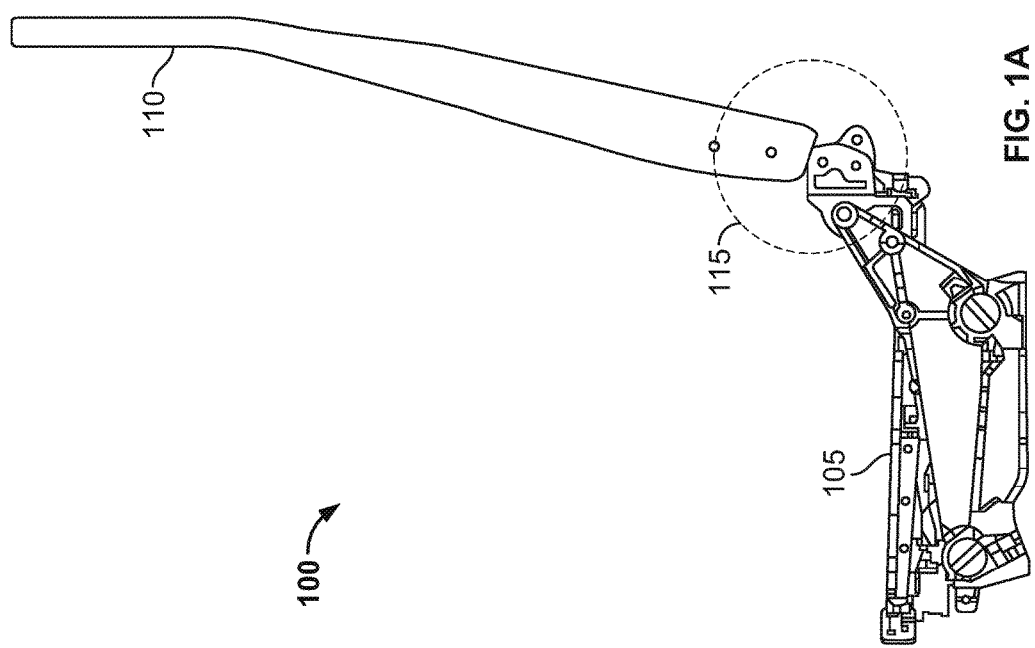
FIG. 1B illustrates an exemplary side elevation of the frame of an aircraft passenger seat after a high G-force event.

Turning to the figures, FIGS. 1A and 1B illustrate a side elevation of a typical aircraft passenger seat 100, including seat bottom frame 105 and seat back 110 (seat and back cushions have been omitted for clarity). In FIG. 1A, seat back 110 is in the normal (full) upright position for taxi, take-off, and landing (TTOL). Under normal in-service conditions, seat back 110 may be allowed to recline rearward, but would be prevented from moving further forward than the full upright (TTOL) position illustrated in FIG. 1A.

In some embodiments, the seat 100 may include a novel breakover mechanism at a hinge area 115 between a back end of the seat bottom frame element 105 and lower end of seat back element 110 that may be triggered during a high G-force event at a predetermined acceleration of the seat 100. In some implementations, the acceleration may cause the seat back 110 to begin to fold forward over the seat bottom frame 105, as illustrated in FIG. 1B, before a passenger makes contact with the seat back, which may help to lessen the impact of the passenger's head against a forward seat. In addition, the fold over action performed by the breakover mechanism may also reduce the load on the seat components and other equipment during the high G-force event and thereby reduce or eliminate breakage of seat parts. Furthermore, a breakover mechanism triggered by a predetermined acceleration may also move structures out of a path of the passenger's head to reduce the possibility or severity of neck injury. In some implementations, instead of or in addition to the breakover mechanism located at hinge area 115, the seat back element 110 may be segmented and include an additional hinge and associated breakover mechanism at mid-seat back such that the additional breakover mechanism may cause a portion of the seat back element 110 above the additional breakover mechanism to rotate forward. Details regarding design options for the breakover mechanism for the seat 100 are discussed further below.

Figure 2:
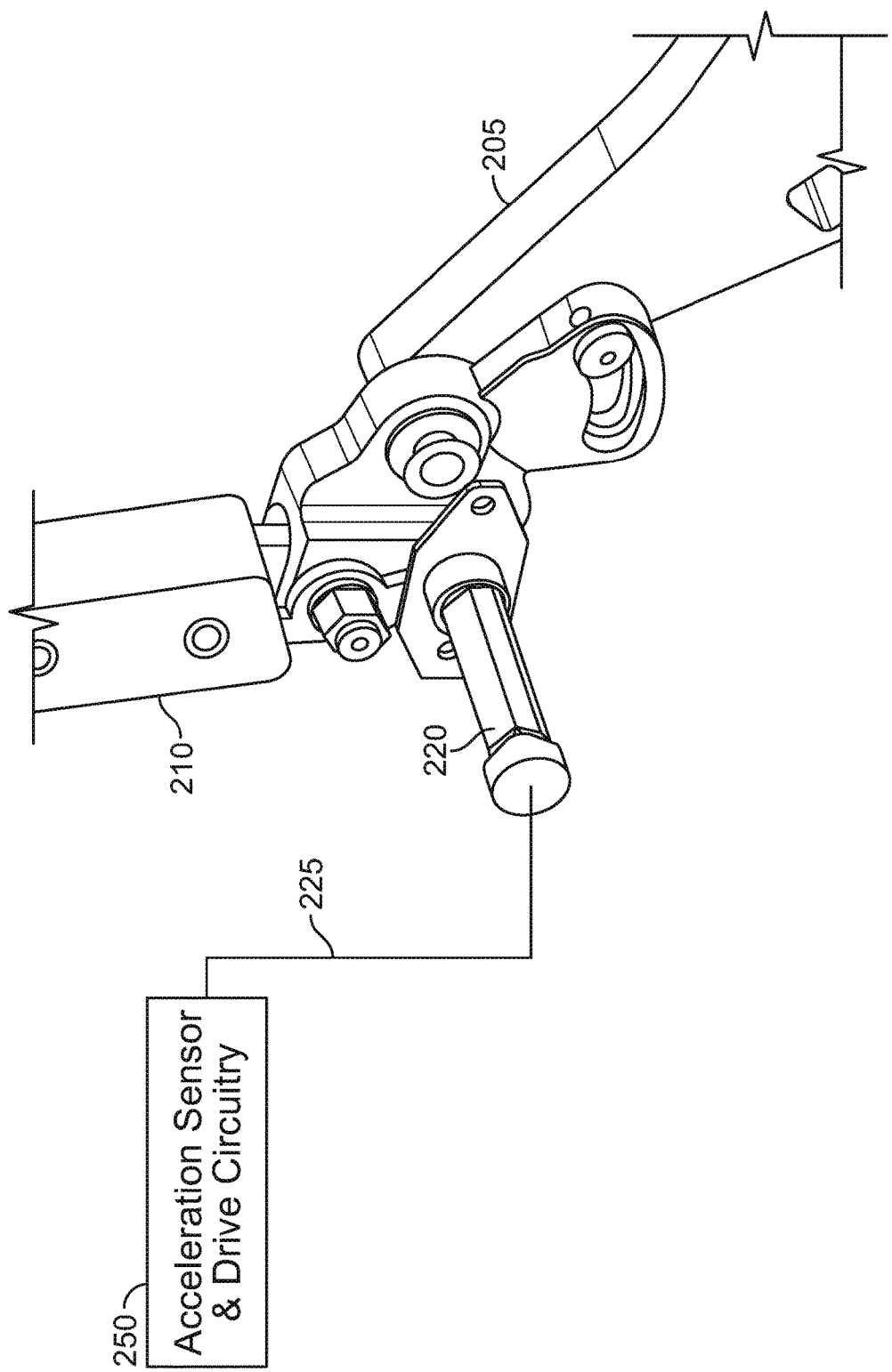
FIG. 2 illustrates an inside view of the hinge area of an aircraft passenger seat according to some embodiments of the present disclosure.

FIG. 2 illustrates an inside view of a hinge area (shown as dotted area 115 in FIG. 1) of an aircraft passenger seat according to some embodiments of the present disclosure. In some embodiments, during a high G-force event, acceleration sensor and drive circuitry 250 may sense the high G-force and provide a drive current through cable 225 to actuator 220 which may be configured to retract a shaft (e.g., pin, rod, annular member, etc.) which, under normal conditions, limits the movement of seat back element 210 with respect to seat bottom frame element 205. When the shaft is retracted, the seat back element 210 becomes uncoupled from seat bottom frame element 205, which allows the seat back element 210 to rotate forward past the full, upright (TTOL) position. Actuator 220, in a first example, may be a pyrotechnic actuator, which may include, among other components, an electrically ignited pyrotechnic charge. Small pyrotechnic actuators can typically exert significant force (10's or 100's of pounds) and achieve actuation speeds as low as several milliseconds. However, pyrotechnic actuators may be limited to one or only a few actuations before needing to be replaced. Actuator 220, in a second example, may be a linear solenoid. A linear solenoid may require a high drive current to exert significant force in a short time period, but a linear solenoid can be used thousands of times without replacement. A speed of deployment of the solenoid is tunable in order to optimize a velocity differential between a portion of the seatback proximate a head of the passenger and a portion of the seatback proximate a lower back of the passenger.

In some implementations, the acceleration sensor and drive circuitry 250 may include sensors that are able to detect changes in velocity of elements to which the sensors are connected such as elements of the seat 100 (e.g., seat back element 210, seat bottom frame element 205) or cabin elements proximate the seat 100 or within the aircraft cabin that correspond to a high G-force event and may include any combination of multi-axis accelerometers, gyroscopes, and magnetometers. In some implementations, accelerometers may be configured to measure an amount of acceleration in a particular direction, gyroscopes may be configured to measure changes in orientation or relative velocity, and magnetometers measure changes in magnetic fields that can be used to determine absolute orientation of the elements to which the magnetometers are connected. Because accelerometers, gyroscopes, and magnetometers may be used to measure different features of inertial movement, the sensor outputs may be combined into a single inertial measurement unit (IMU).

Although illustrated as being dedicated to a single seat unit, in other embodiments, acceleration sensor and drive circuitry 250 may be centrally located amidst multiple seats or within the aircraft cabin and provide the drive current for multiple actuators 220. For example, acceleration sensor and drive circuitry 250 may be located in or near a particular seat (or group of seats) for activating breakover in a designated section of passenger seats 100. In one example, the acceleration sensor and drive circuitry 250 may be dedicated to a contiguous seating row (e.g., two or more seats 100 positioned proximate each other and spanning from an aisle to a window). In another example, the acceleration sensor and drive circuitry 250 may be dedicated to a passenger seating cluster (e.g., a grouping of passenger seats arranged between a fore monument or divider and an aft monument or divider). The passenger seating cluster may or may not be further segmented by one or more aisles arranged within the cabin section. In an illustrative example, the passenger seating cluster may be organized between a first class divider and a lavatory monument, from the windows to an aisle region. Other divisions of passenger seats are possible. Divisions of passenger seats, in one example, may be dictated in part based upon a distance between the acceleration sensor and drive circuitry 250 which may affect timing or consistency of triggering the breakover mechanism in a particular passenger seat. In another example, divisions of passenger seats may be dictated in part upon maintaining protected connections between the acceleration sensor and drive circuitry 250 and the individual breakover mechanism. In illustration, in a wired configuration, wires may be maintained above an under seat stowage area and a seat cushion such that connections cannot be reached and damaged through passenger use of the seats.

In another implementation, the acceleration sensor and drive circuitry 250 may be wirelessly connected to the actuator 220 for one or more seats 100 through a short-range wireless communication network, such as a Wi-Fi, Li-Fi, Bluetooth, Zigbee, or Ultra Wide Band (UWB) network. For example, the acceleration sensor and drive circuitry 250 and actuator 220 may each include wireless communication circuitry, such as a radio, transceiver, and other associated circuitry, that allow the acceleration sensor and drive circuitry 250 and actuator 220 to communicate via the wireless communication network. The type of wireless communication technology that is used for the implementations described herein can be based on various factors that can include battery life, data usage, security and/or line-of-sight restrictions, and other concerns. In some embodiments, ZigBee or Bluetooth wireless communications may be used in applications where link security is prioritized. In other embodiments where frequency interference is a concern, Bluetooth or UWB communications may be used since both technologies use adaptive frequency hopping to avoid channel collision. In embodiments where a total of frequency channels is prioritized, Bluetooth wireless communications may be used.

In some examples, the acceleration sensor and drive circuitry 250 for a particular seat 100 or set of seats may include back-up acceleration and/or drive circuitry that may be used to cause actuation of the actuator 220 in situations of malfunction or failure of primary acceleration sensor and drive circuitry 250 for the seat 100 or set of seats. In some implementations, the primary acceleration sensor and drive circuitry 250 and/or the actuator 220 that detects that the acceleration sensor and drive circuitry 250 has failed can output an activation signal to back-up acceleration sensor and drive circuitry to configure the back-up acceleration sensor and drive circuitry as the primary acceleration sensor and drive circuitry 250 for the seat or seat 100 or set of seats.

Figure 4:
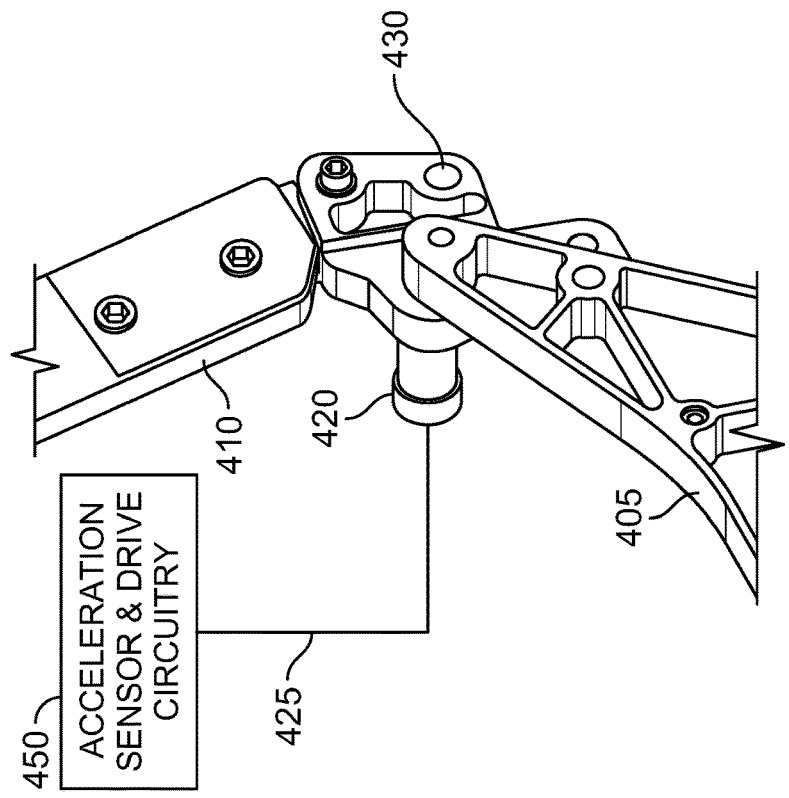
FIG. 4 illustrates another outside view of the hinge area of an aircraft passenger seat after a high G-force event according to some embodiments of the present disclosure.
Figure 3:
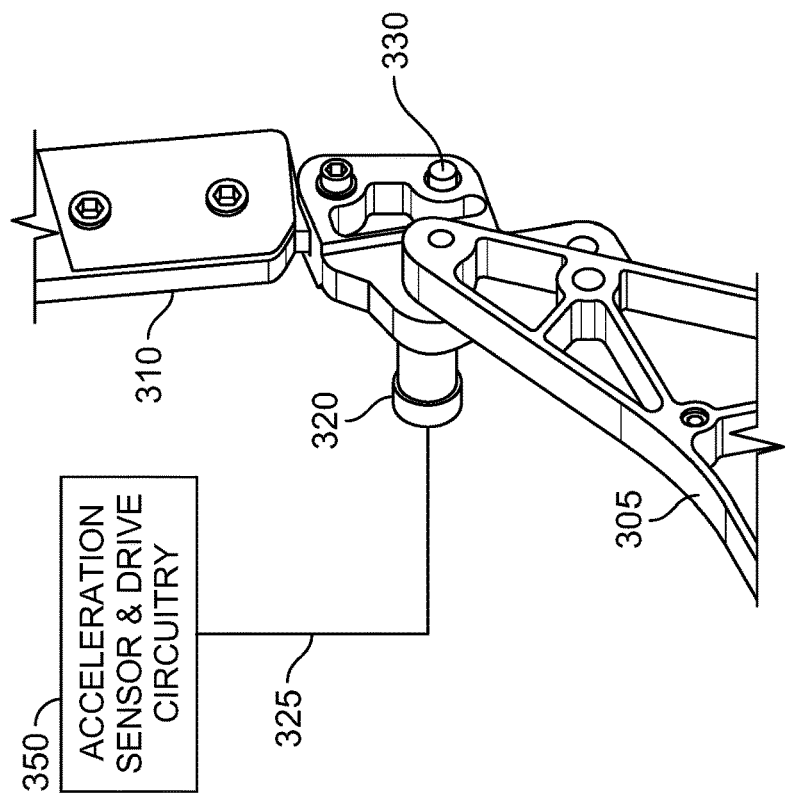
FIG. 3 illustrates an outside view of the hinge area of an aircraft passenger seat with the seat back in the full upright position according to some embodiments of the present disclosure.

Turning to FIGS. 3 and 4, outside views of the hinge area (shown as dotted area 115 in FIG. 1) of an aircraft passenger seat according to some embodiments of the present disclosure are illustrated. In FIG. 3, under normal operating conditions, shaft 330 may limit the forward travel of seat back element 310 with respect to seat bottom frame element 305. In some embodiments, the normal (in-service) limit on the forward travel of seat back element 310 may be defined as the full upright position of the seat back. FIG. 3 also shows the positions of seat bottom frame element 305, actuator 320, and cable 325 in the normal in-service upright positions. Acceleration sensor and drive circuitry 350 may be connected to cable 325 and provide an actuation function in case of a high G-force event to cause retraction of the shaft 330 from a recess 430 (FIG. 4) that keeps the seat back element 310 from moving forward past the full upright (TTOL) position during normal operations. In some implementations, the actuation function performed by the actuator 320 in response to receiving a control signal from the acceleration sensor and drive circuitry 350 may include overcoming a spring force to uncouple the shaft 330 from the recess 430.

FIG. 4 illustrates an exemplary situation after, for example, a high G-force event. In FIG. 4, acceleration sensor and drive circuitry 450 may have provided a drive signal to actuator 420, which may have allowed seat back element 410 to move forward with respect to seat bottom frame element 405 after actuator 420 has retracted the shaft (shown as shaft 330 in FIG. 3, and as recess 430 in FIG. 4) that normally keeps seat back element 410 from moving forward past the full upright position.

Figure 5B:
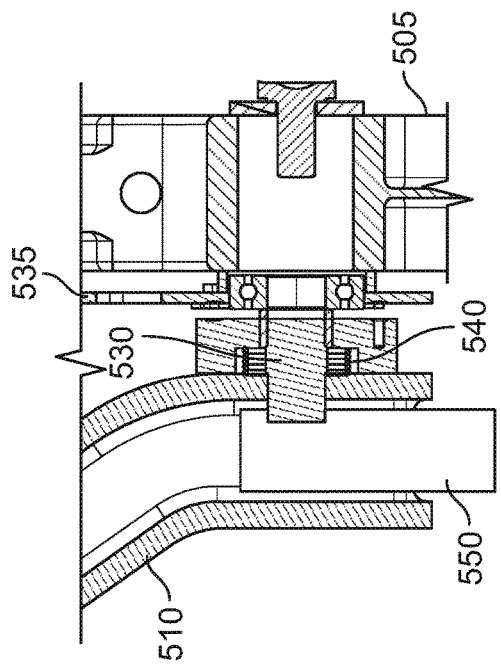
FIGS. 5A through 5C illustrate a number of views of the hinge area of an aircraft passenger seat according to another embodiment of the present disclosure.
Figure 5C:
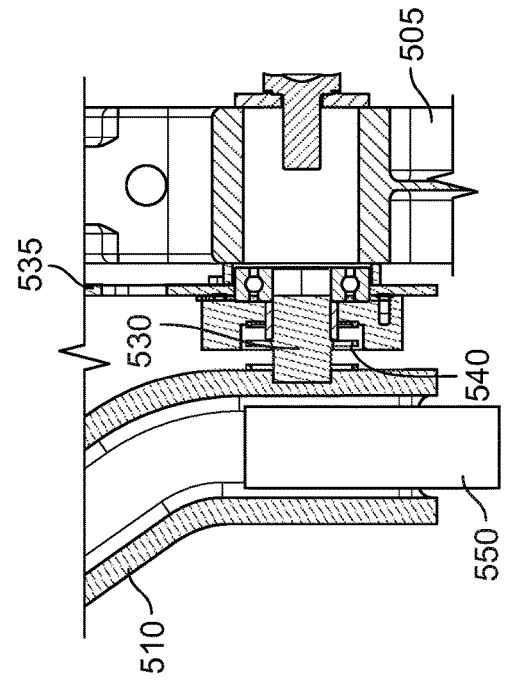
Figure 5A:
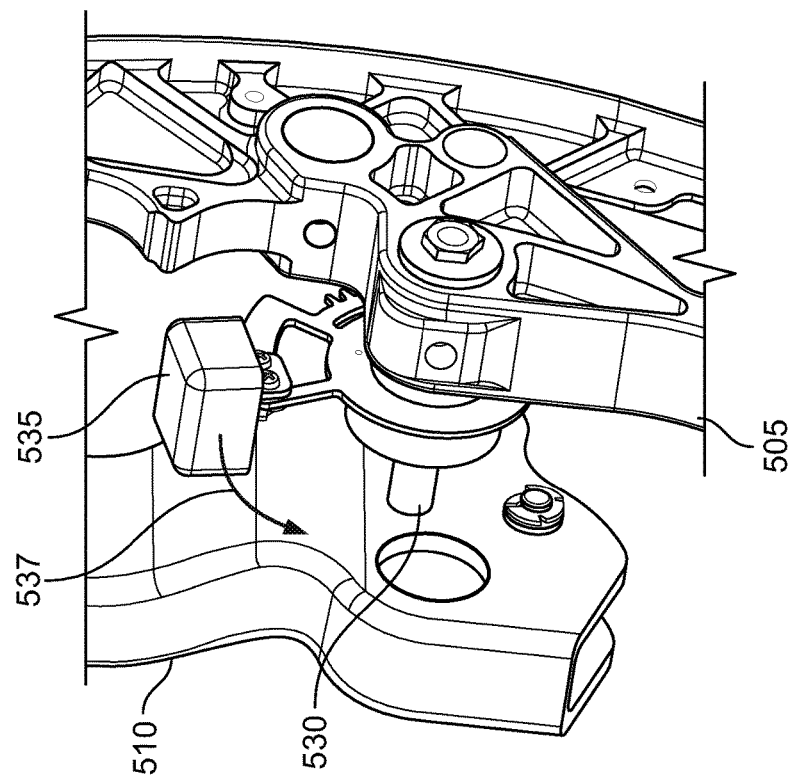

FIGS. 5A, 5B and 5C illustrate a number of views of the hinge area (shown as dotted area 115 in FIG. 1) of an aircraft passenger seat according to another embodiment of the present disclosure. FIG. 5A illustrates a partially exploded view of the hinge area, including a seat bottom frame element 505, a seat back element 510, a shaft 530, and an inertial release assembly 535. In some embodiments, inertial release assembly 535 is affixed at a rear end of shaft 530 adjacent to seat bottom frame element 505 and may rotate forward (in the direction of arrow 537) during a high G-force event causing the shaft 530 to retract from the seat back element 510, thereby allowing forward rotation of the seat back element 510 forward of the full upright (TTOL) position. FIG. 5B illustrates a cross-sectional view of the hinge area where, under normal operating conditions, shaft 530 is inserted into a recess in the seatback element 510 and may limit the forward travel of seat back element 510 with respect to seat bottom frame element 505. In some embodiments, the normal (in-service) limit on the forward travel of seat back element 510 may be defined as the full upright TTOL position of the seat back.

FIG. 5C illustrates another cross-sectional view of an exemplary situation after, for example, a high G-force event. In some implementations, inertial release assembly 535 includes a weighted end that may remain static during normal operations but may rotate in forward direction 537 during a high G-force event. The rotation of the inertial release assembly 535 pulls or retracts the shaft 530 from the recess in the seat back element 510 with the assistance of spring 540 that expands along a length of the shaft 530 as the inertial release assembly 535 retracts the shaft 530 from the recess. As shown in FIG. 5C, a high G-force event may cause seat back element 510 to move forward with respect to seat bottom frame element 505 after inertial release assembly 535 has rotated and allowed spring 540 to expand from its compressed state (in FIG. 5B) to cause retraction of the shaft 530. A speed of activation of the inertial release assembly 535 may be tunable in order to optimize a velocity differential between a portion of the seatback proximate a head of the passenger and a portion of the seatback proximate a lower back of the passenger.

Figure 6B:
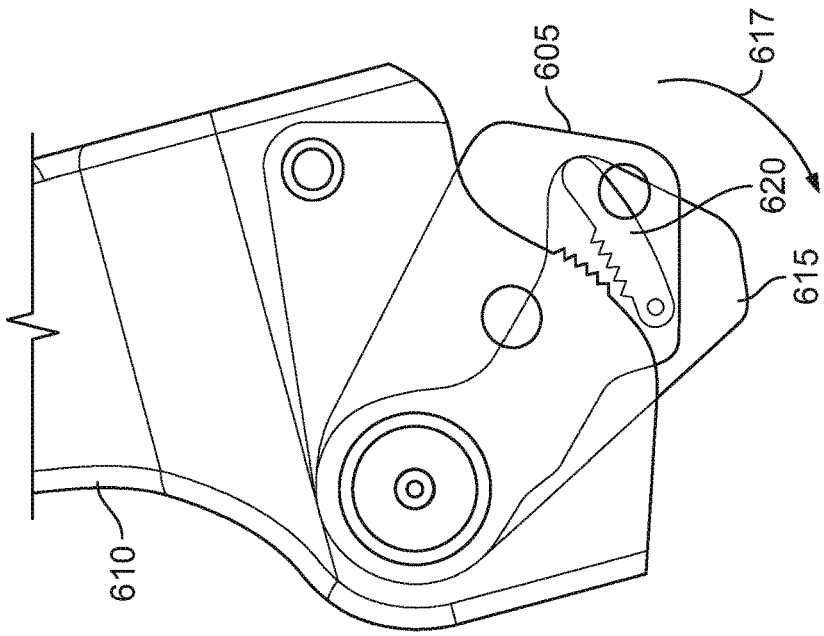
FIGS. 6A and 6B illustrate two views of the hinge area of an aircraft passenger seat according to yet another embodiment of the present disclosure.
Figure 6A:
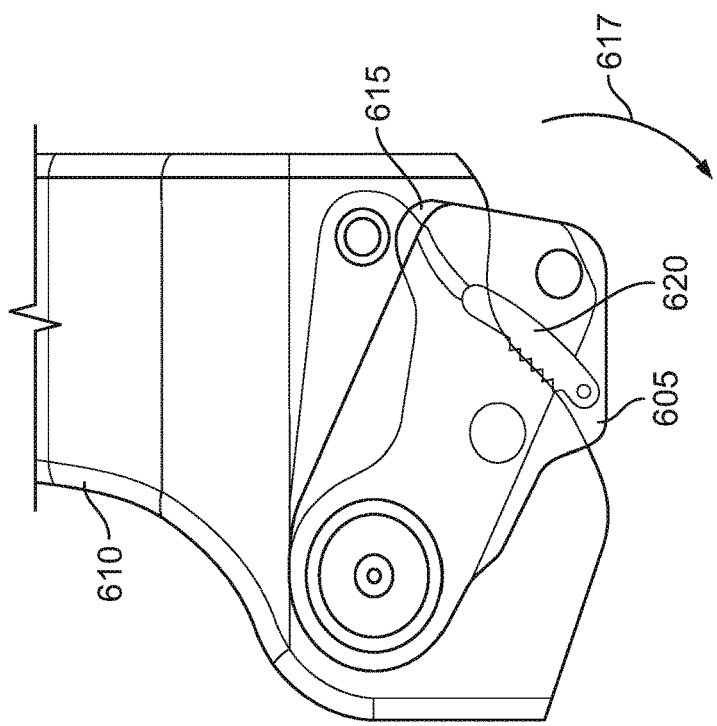

FIGS. 6A and 6B illustrate two views of the hinge area (shown as dotted area 115 in FIG. 1) of an aircraft passenger seat according to yet another embodiment of the present disclosure. FIG. 6A illustrates a view of the hinge area where the seat back is in the full upright TTOL position, including a component of a seat bottom frame element 605, seat back element 610, inertial link 615, and gear latch 620. In some embodiments, under normal conditions, a gear feature on gear latch 620 meshes with a complementary gear feature on seat back element 610, keeping the seat back from folding forward of the full upright position. FIG. 6B illustrates how, in some embodiments, inertial link 615 may rotate forward (in the direction of arrow 617) during a high G-force event. As inertia link 615 rotates, a shaft in gear latch 620 may follow a slot in inertia link 615, which may, in turn, disengage the gear feature in gear latch 620 from the complementary gear feature in seat back element 610 and allow the seat back to tilt forward of the full upright position.

Figure 7:
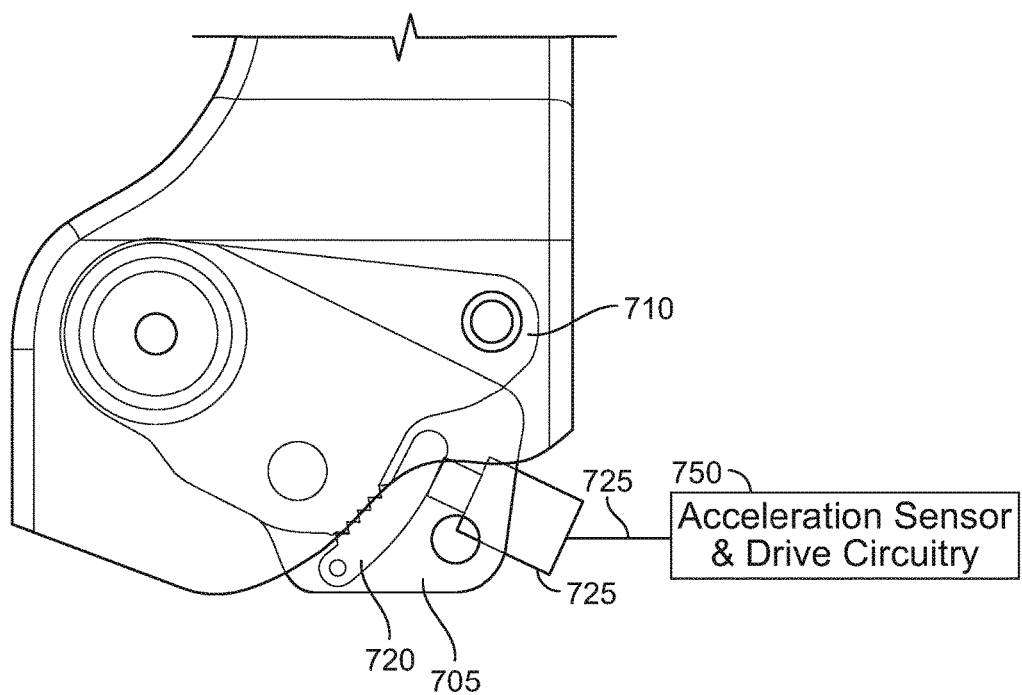
FIG. 7 illustrates a view of the hinge area of an aircraft passenger seat according to yet another embodiment of the present disclosure.

FIG. 7 illustrates a view of the hinge area (shown as dotted area 115 in FIG. 1) of an aircraft passenger seat according to yet another embodiment of the present disclosure. In FIG. 7 the hinge area may include a component of a seat bottom frame element 705, seat back element 710, gear latch 720 and solenoid 725. In some embodiments, solenoid 725 may be actuated by acceleration sensor and drive circuitry 750, through cable 725, during a high G-force event to pull gear latch 720 which may, in turn, disengage a gear feature in gear latch 720 from a complementary gear feature in seat back element 710 and allow the seat back to tilt forward beyond the full upright position. A speed of deployment of the solenoid is tunable in order to optimize a velocity differential between a portion of the seatback proximate a head of the passenger and a portion of the seatback proximate a lower back of the passenger.

FIGS. 8A-8E, 9A, and 9B illustrate various views of the hinge area (shown as dotted area 115 in FIG. 1) and breakover mechanism of an aircraft passenger seat according to yet another embodiment of the present disclosure. In this embodiment, the breakover mechanism may include shaft 805, collar 810, spring mechanism 815 (e.g., spring, rubber bearing, etc.) and one or more balls 825. In some embodiments, collar 810 may be attached to a seat back 820. Under normal operating conditions, as illustrated in FIG. 8A, shaft 805 may be held in place within a recess 902 (FIGS. 9A-9B) in the seat back 820 such that shaft end portion 808 extends past an outer surface of the seat back 820. In some examples, the shaft 805 may be held in place by an inertial release mechanism, solenoid, and/or actuator with associated acceleration sensor and drive circuitry. In addition, during normal operation conditions, spring 815 may be in a compressed state.

FIG. 8C illustrates shaft 805 and the one or more balls 825, with the collar 810 removed for clarity. As shown in FIGS. 8A and 8C, shaft 805 may include rod 806, ball entrapment element 807, shaft end portion 808 and shoulder 809, which all move together when the breakover mechanism is activated. Under normal operating conditions, ball entrapment element 807 of shaft 805 holds the one or more balls 825 within channels 827 formed in the outer rim of ball entrapment element 807. FIG. 8D illustrates a cross-sectional view of a portion of collar 810 and shows the one or more balls 825 trapped within recesses 828 in collar 810. The channels 827 on the outer rim of ball entrapment element 807 and the recesses 828 in collar 810 hold the one or more balls 825 in place and prevent linear and axial movement of the one or more balls 825 and prevent shaft 805 from rotating within collar 810. This may prevent the passenger seat from moving forward past the full upright position. In some implementations, the shaft 805 and collar 810 may be coaxial with one another and rotationally locked with the ball entrapment element 807. The shaft 805 may be attached to the frame of the seat back 820 and can move axially but is locked radially, while the collar 810 is attached to the seat back 820. When the shaft 805 is moved axially, the lock may be disengaged and the collar 810 can rotate freely around the shaft 805.

FIGS. 8B and 8E illustrate the situation where the breakover mechanism has been "activated" in response to a high G-force event by, for example, an inertial release assembly, solenoid, and/or actuator with associated acceleration sensor and drive circuitry. In the activated state, shaft 805 is pushed to the left (as illustrated in FIG. 8B) as spring 815 expands between shoulder 809 and collar 810 such that the shaft end portion 808 is withdrawn from the recess 902 in the seat back 820. The one or more balls 825 may fall into a recess in shaft 805, allowing for shaft 805 to rotate freely within collar 810. When this occurs, there may be a rotational freedom of movement between collar 810 and shaft 805, which may allow for the seat back 820 to tilt forward of the full upright position.

FIGS. 9A and 9B present a slightly expanded perspective view of the embodiments shown in FIGS. 8A and 8B, respectively. For example, FIG. 9A illustrates an implementation of the seat back 820 during normal operating conditions when shaft 805 may be held in place within recess 902 in the seat back 820 such that shaft end portion 808 extends past an outer surface of the seat back 820, which may prevent the seat back 820 from rotating forward past the full, upright (TTOL) position. In addition, during normal operation conditions, spring 815 may be in a compressed state. When the breakover mechanism is activated during a high G-force event, shaft 805 is pushed to the left (as illustrated in FIG. 9B) as spring 815 expands between shoulder 809 and collar 810 such that the shaft end portion 808 is withdrawn from the recess 902 in the seat back 820. The one or more balls 825 may fall into a recess in shaft 805, allowing for shaft 805 to rotate freely within collar 810. When this occurs, there may be a rotational freedom of movement between collar 810 and shaft 805, which may allow for the seat back 820 to tilt forward of the full upright position.

Figure 10A:
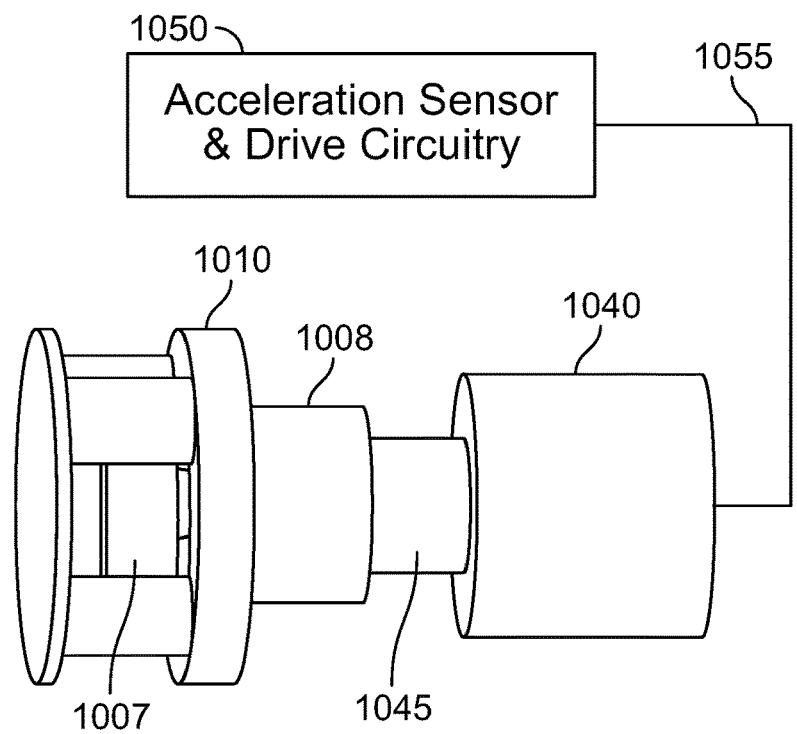
FIGS. 10A and 10B illustrate two views of a breakover mechanism of an aircraft passenger seat according to some embodiments of the present disclosure.
Figure 10B:
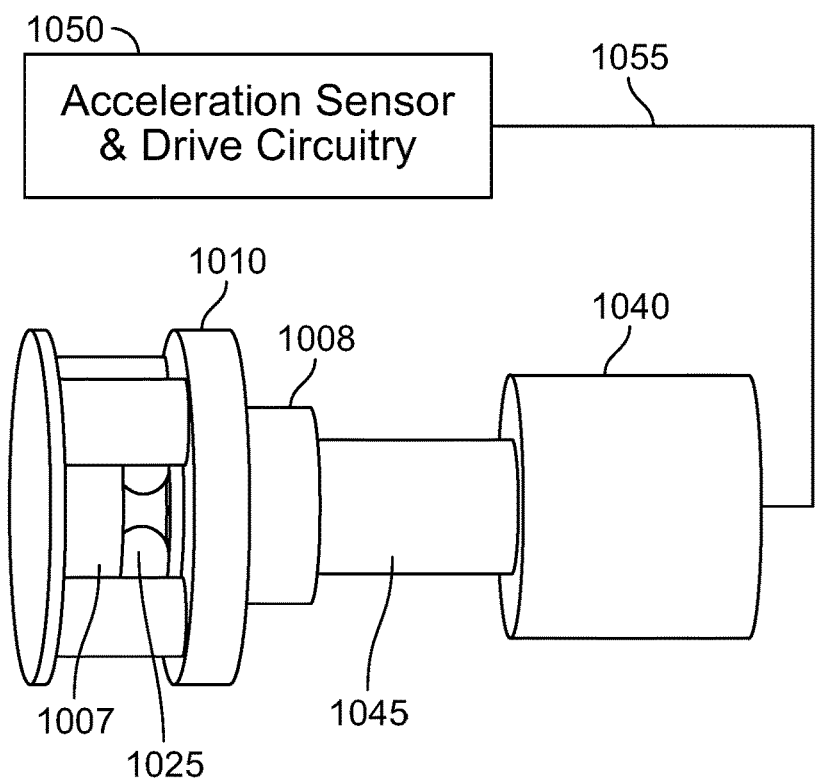

FIGS. 10A and 10B illustrate two views of a breakover mechanism of an aircraft passenger seat according to embodiments illustrated in FIGS. 8A-8E, 9A, and 9B. In these illustrations, the breakover mechanism may include ball entrapment element 1007, shaft 1008, collar 1010, one or more balls 1025, solenoid 1040, and solenoid shaft 1045. FIG. 10B illustrates the situation where, for example, during a high G-force event, the breakover mechanism has been "activated" by acceleration sensor and drive circuitry 1050 energizing solenoid 1040 through cable 1055, which may drive solenoid shaft 1045 to the left. Acceleration sensor and drive circuitry 1050 may, in some embodiments, be centrally located and provide the drive current for multiple solenoids. In other embodiments, the acceleration sensor and drive circuitry may be located in or near a particular seat (or group of seats). In such embodiments, the acceleration sensor and drive circuitry 1050 may provide the drive current for one or a few actuators. In some embodiments, when solenoid 1040 drives solenoid shaft 1045 to the left, the one or more balls 1025 may fall into a recess in shaft 1008, allowing for shaft 1008 to rotate freely within collar 1010. When this occurs, there may be a rotational freedom of movement between collar 1010 and shaft 1008, and this may allow for the seat back to tilt forward beyond the full upright position.

FIGS. 11A and 11B illustrate two views of a breakover mechanism of an aircraft passenger seat according to embodiments illustrated in FIGS. 8A-8E, 9A, and 9B. In these illustrations, the breakover mechanism may include shaft 1105 (including ball entrapment element 1107 and shaft 1108), collar 1110, spring 1115, one or more balls 1125 and inertial lever 1150. Under normal operating conditions, as illustrated in FIG. 11A, shaft 1105 may be held in place by inertial lever 1150, and spring 1115 may be in a compressed state. FIG. 11B illustrates the situation where the breakover mechanism has been "activated" by the movement of inertial lever 1150 in response to a high G-force event. In some embodiments, a weighted end 1155 of inertial lever 1150 may cause inertial lever 1150 to rotate and move in such a manner that shaft 1105 may move to the left, whereupon the one or more balls 1125 may fall into a recess in shaft 1105, allowing for shaft 1105 to rotate freely within collar 1110. When this occurs, there may be a rotational freedom of movement between collar 1110 and shaft 1105, and this may allow for the seat back to tilt forward beyond the full upright position.

Figure 12:
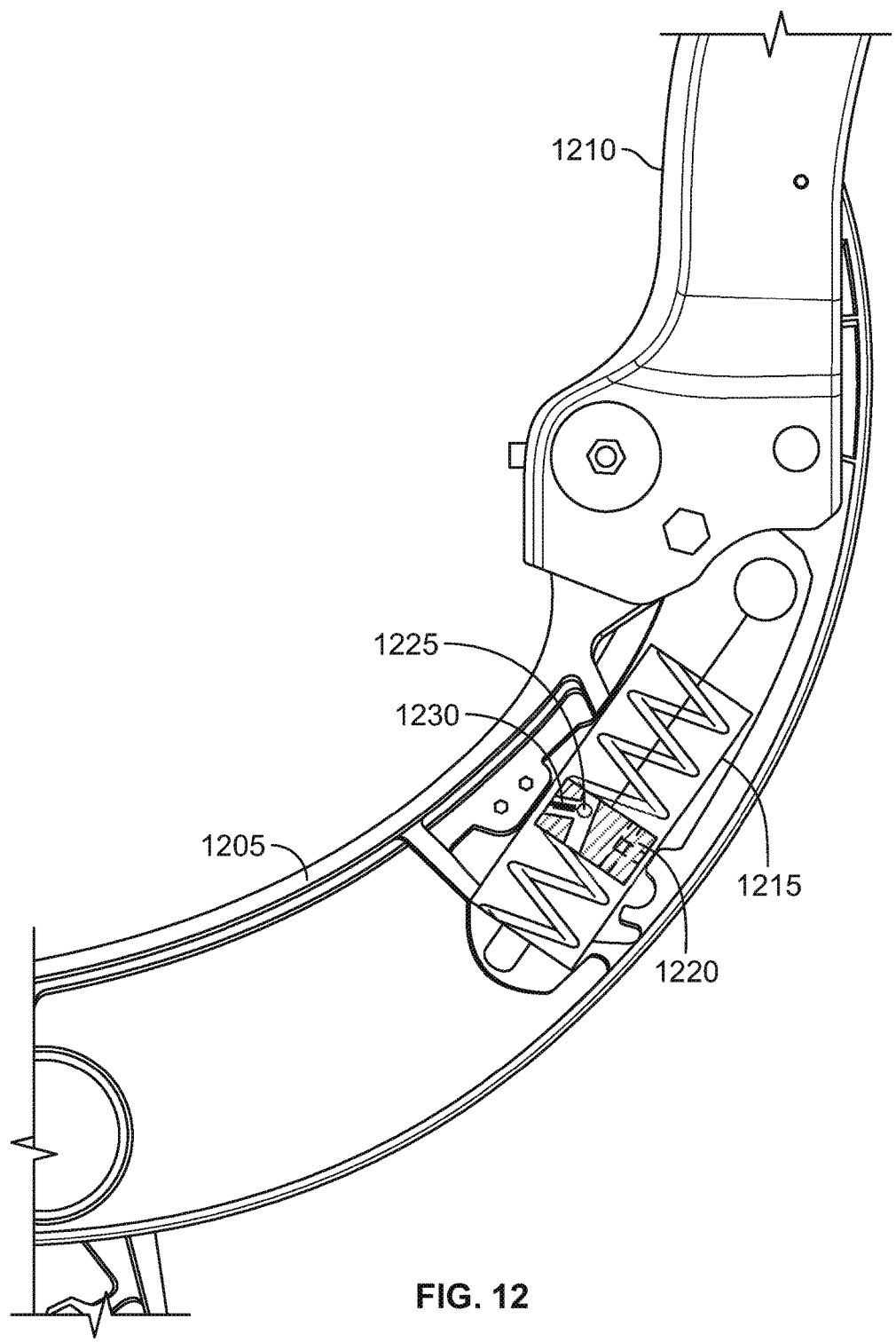
FIG. 12 illustrates a view of the hinge area and breakover mechanism of an aircraft passenger seat according to yet another embodiment of the present disclosure.

FIG. 12 illustrates a view of the hinge area (shown as dotted area 115 in FIG. 1) and breakover mechanism of an aircraft passenger seat according to yet another embodiment of the present disclosure. In some embodiments, the breakover mechanism may be incorporated into, or associated with, a traditional seat recline mechanism. Referring to FIG. 12, under normal operating conditions, recline lock cylinder 1215 may allow for rearward movement of seat back element 1210 (reclining) under the control of a seated passenger, but limit the forward travel of seat back element 1210 with respect to seat bottom frame element 1205. In some embodiments, the normal (in-service) limit on the forward travel of seat back element 1210 may be defined as the full upright TTOL position of the seat back element 1210. Recline lock cylinder 1215 may include a piston 1220, ball check 1225, and spring 1230. Additional elements, not shown in FIG. 12, may be provided within recline lock cylinder 1215 to facilitate normal recline functionality. In some embodiments, recline lock cylinder 1215 may be filled with a gas, while in other embodiments, recline lock cylinder 1215 may be filled with a fluid (a hydraulic fluid, for example). In some embodiments, in response to a high G-force event, ball 1125 may move forward (toward the left in FIG. 12), compressing spring 1230, and allowing fluid (or gas) to pass through piston 1220 which, in turn, may allow the seat back to move forward beyond the full upright (TTOL) position. Ball 1225 may be oriented perpendicular to seat back loads and may therefore be decoupled from typical loads (normal passenger movement). In some embodiments, the breakover mechanism may be embodied separately from recline lock cylinder 1215 (a separate cylinder, for example). Ball 1225 may, in some embodiments, be mounted separately from recline lock cylinder 1215 to allow independent orientation of ball 1225 and spring 1230 from recline lock cylinder 1215.

Figure 13B:
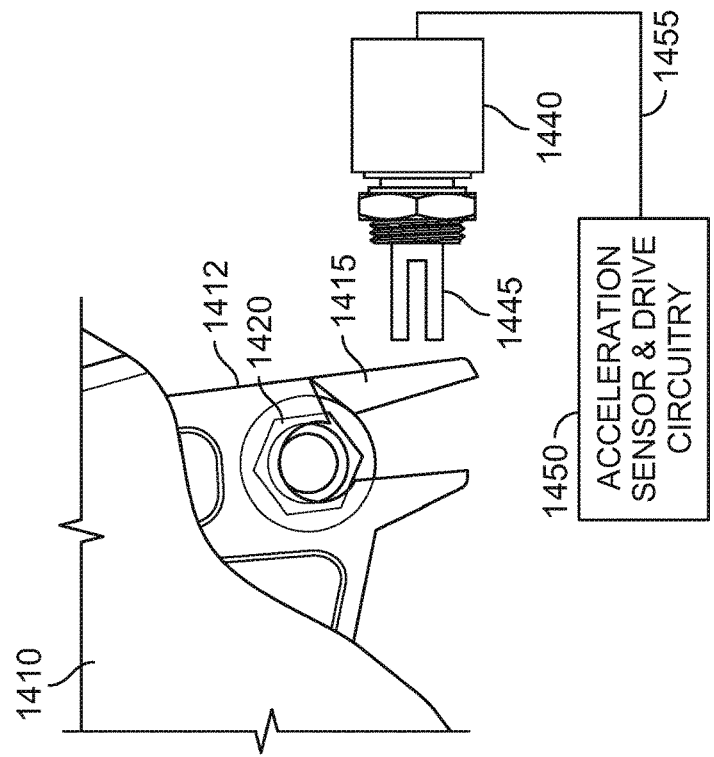
FIGS. 13A and 13B illustrate two views of a breakover mechanism of an aircraft passenger seat according to some embodiments of the present disclosure.
Figure 13A:
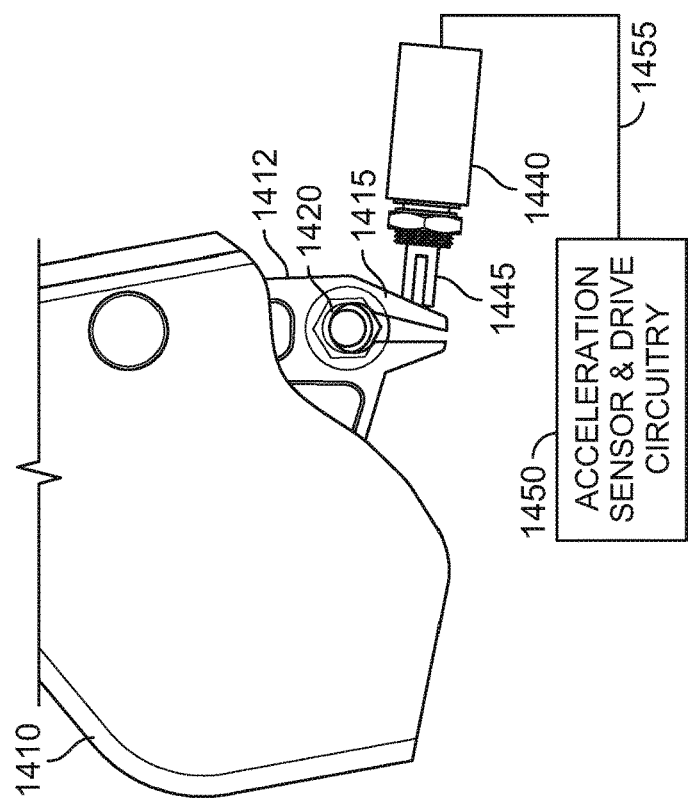

FIGS. 13A and 13B again illustrate a view of the hinge area (shown as dotted area 115 in FIG. 1) and breakover mechanism of an aircraft passenger seat. In FIG. 13A, bracket 1412 may be fixedly attached to seat back element 1410. Bracket 1412 may also be pivotably attached to a recline lock cylinder (not shown) by way of fastener 1420. The recline lock cylinder may provide for normal rearward recline functionality of the passenger seat. In some embodiments, bracket 1412 may also include clothespin feature 1415 that may allow, under some circumstances, for fastener 1420 (and the recline lock cylinder) to detach from bracket 1412, allowing the seat back to tilt forward of the full upright (TTOL) position. In some embodiments, solenoid 1440 and solenoid shaft 1445 may be positioned and configured to provide for activation of the breakover mechanism. For example, the right element of clothespin feature 1415 may be hingedly connected to bracket 1412. Under normal conditions, solenoid 1440 and solenoid shaft 1445 may hold clothespin feature 1415 together, preventing fastener 1420 from detaching from bracket 1412. During a high G-force event, in some embodiments, an acceleration sensor and drive circuitry 1450 may provide a drive current through cable 1455 to solenoid 1440, which may act to retract solenoid shaft 1445, and thereby allow clothespin feature 1415 to open (as shown in FIG. 13B). Once clothespin feature 1415 has opened, fastener 1420 (and the recline lock cylinder) may detach from bracket 1412, allowing the seat back to tilt forward of the full upright (TTOL) position.

Figure 14:
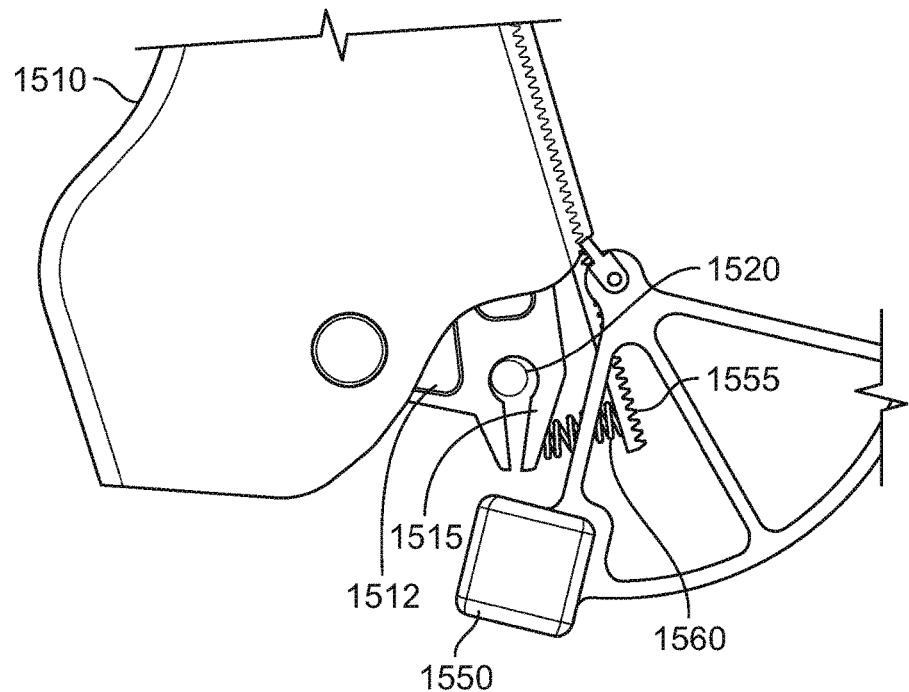
FIG. 14 illustrates an alternative actuation mechanism for some embodiments of the present disclosure.

FIG. 14 illustrates an alternative actuation mechanism for the embodiments illustrated in FIGS. 13A and 13B. In FIG. 14, bracket 1512 may be fixedly attached to seat back element 1510. Bracket 1512 may also be pivotably attached to a recline lock cylinder (not shown) by way of a fastener 1520. In some embodiments, bracket 1512 may also include clothespin feature 1515 that may allow, under some circumstances, for fastener 1520 and the recline lock cylinder to detach from bracket 1512, allowing the seat back to tilt forward of the full upright (TTOL) position. In some embodiments, a weighted inertial release 1550 may be employed with open clothespin feature 1515. For example, weighted inertial release 1550 may pivot forward (clockwise in FIG. 14) during a high G-force event, releasing spring 1560 that, under normal circumstances, holds clothespin feature 1515 closed.

Figure 15A:
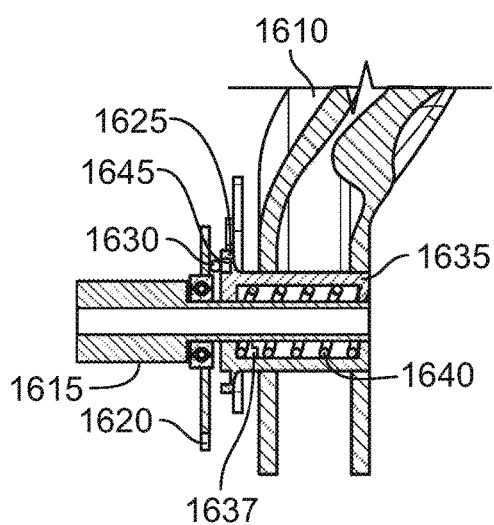
FIGS. 15A and 15B illustrate views of the hinge area and breakover mechanism of an aircraft passenger seat according to yet another embodiment of the present disclosure.
Figure 15B:
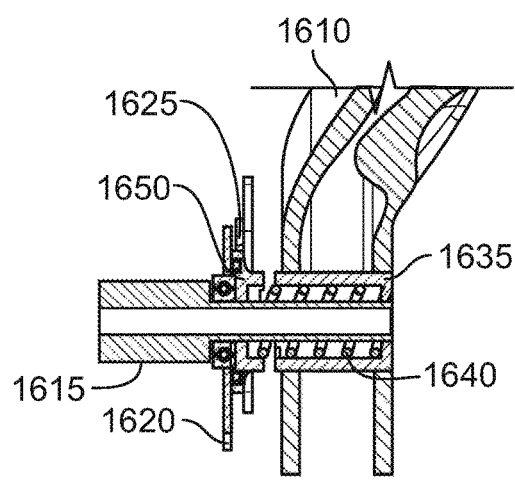

FIGS. 15A and 15B illustrate views of the hinge area (shown as dotted area 115 in FIG. 1) and breakover mechanism of an aircraft passenger seat according to yet another embodiment of the present disclosure. This embodiment may include seat back element 1610, shaft 1615, trigger ring 1620, gear ring 1625, one or more balls 1630, gear bushing 1635, and spring 1640. In some embodiments, seat back element 1610 may be fixedly attached to gear bushing 1635. Under normal operating conditions (FIG. 15A), gear ring 1625 and gear bushing 1635 are in a locked condition (gear teeth 1637 are meshed). In a high G-force event, acceleration may cause the lower portion of trigger ring 1620 to swing forward as illustrated in FIG. 15B. This may cause the one or more balls 1630 to roll into pockets 1645 in gear ring 1625 (illustrated as ball in pocket 1650 in FIG. 15B) as a result of the force applied by spring 1640. This may collapse the space between gear ring 1625 and trigger ring 1620 as illustrated in FIG. 16B, disengaging the teeth between gear ring 1625 and gear bushing 1635. When this occurs, there may be a rotational freedom of movement of seat back element 1610, and this may allow for the seat back to tilt forward beyond the full upright (TTOL) position.

Figure 16C:
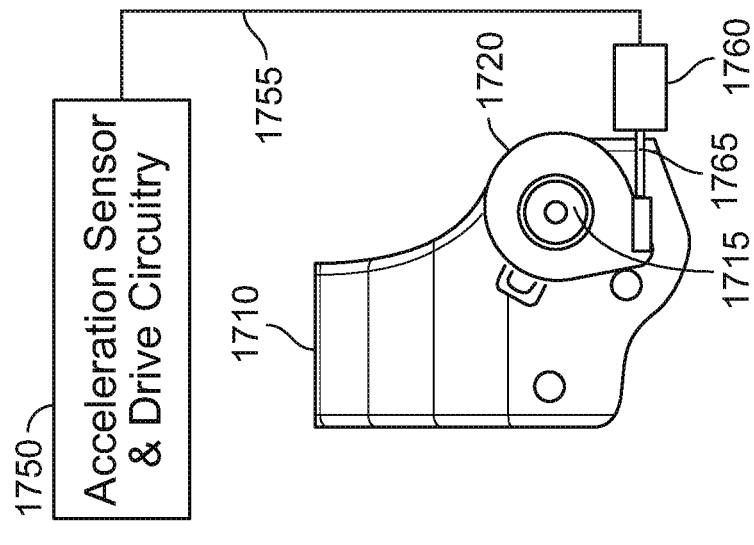
FIGS. 16A through 16C illustrate an exemplary implementation of a breakover actuation mechanism for some embodiments of the present disclosure.
Figure 16B:
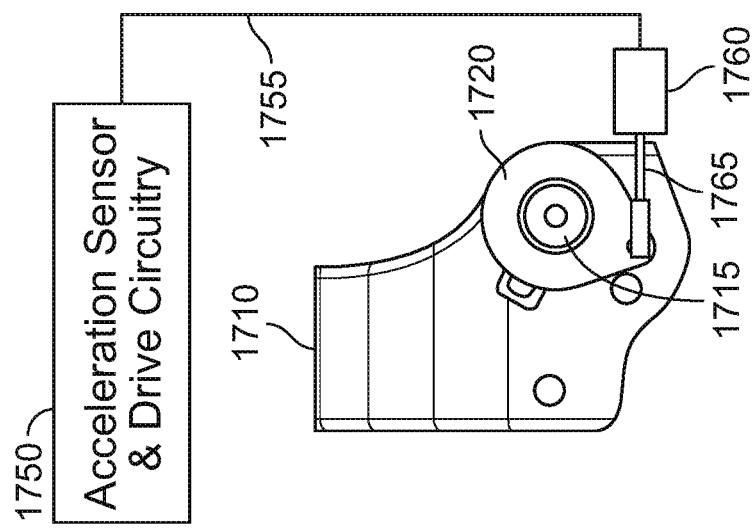
Figure 16A:
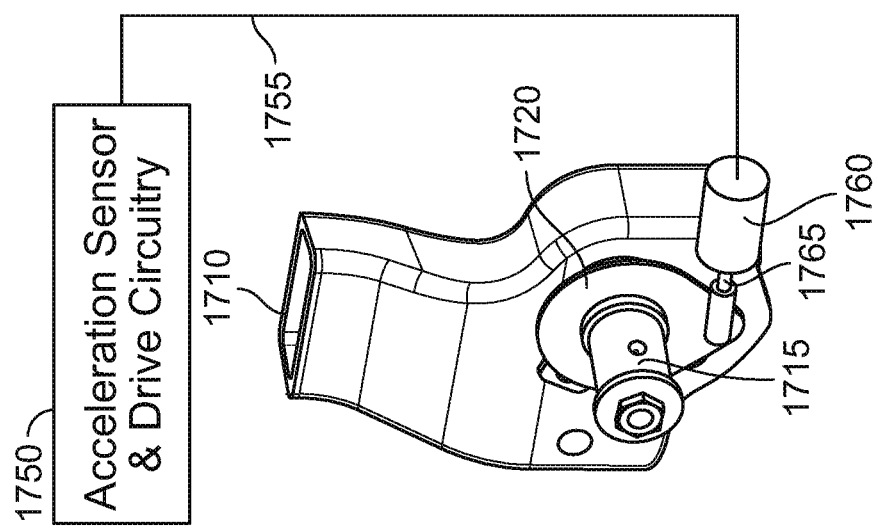

FIGS. 16A, 16B and 16C illustrate an exemplary implementation of a breakover actuation mechanism for the embodiments illustrated in FIGS. 15A and 15B. FIGS. 16A, 16B and 16C each show seat back element 1710, shaft 1715, trigger ring 1720, acceleration sensor and drive circuitry 1750, cable 1755, solenoid 1760, solenoid shaft 1765. Some components of the embodiments illustrated in FIGS. 15A and 15B are not shown for clarity. Under normal operating conditions (FIG. 16B), trigger ring 1720 may be held in a position by solenoid 1760 and solenoid shaft 1765. This may limit the forward rotation of seat back element 1710 past the full upright (TTOL) position. In a high G-force event, acceleration sensor and drive circuitry 1750 may provide a drive current, through cable 1755, to solenoid 1760, which may act to extend solenoid shaft 1765, and thereby rotate trigger ring 1720 in a clockwise direction. When this occurs, there may be a rotational freedom of movement of seat back element 1710, and this may allow for the seat back to tilt forward beyond the full upright (TTOL) position.

Figure 17C:
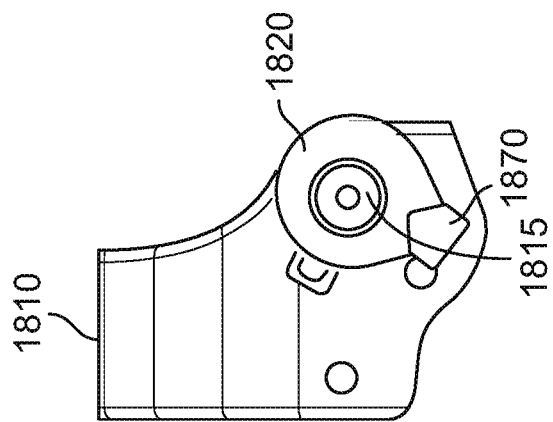
FIGS. 17A through 17C illustrate another exemplary implementation of a breakover actuation mechanism for some embodiments of the present disclosure.
Figure 17B:
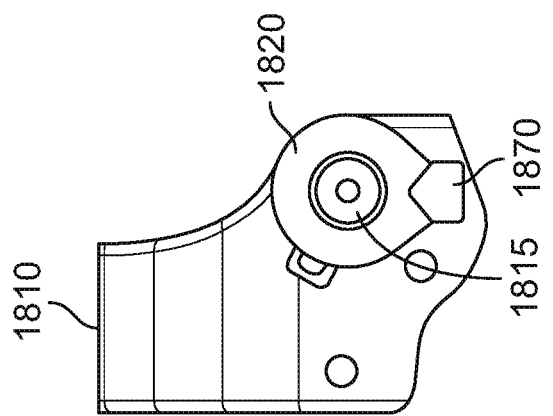
Figure 17A:
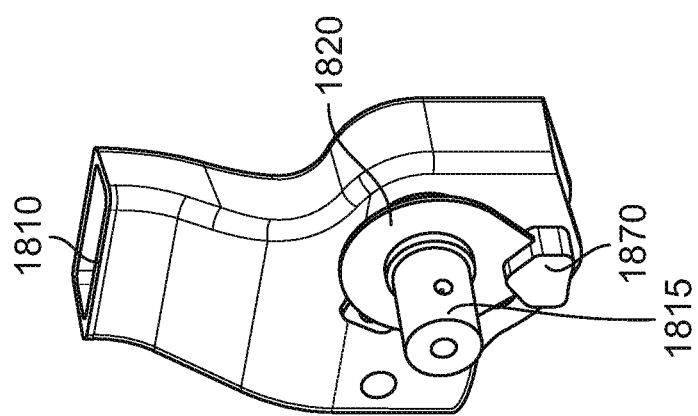

FIGS. 17A, 17B and 17C illustrate another exemplary implementation of a breakover actuation mechanism for the embodiments illustrated in FIGS. 15A and 15B. FIGS. 17A, 17B and 17C each show seat back element 1810, shaft 1815, trigger ring 1820 and weighted element 1870. In some embodiments, weighted element 1870 is fixedly attached to trigger ring 1820. Some components of the embodiments illustrated in FIGS. 15A and 15B are not shown for clarity. Under normal operating conditions (FIG. 17B), trigger ring 1820 may be held in a position by weighted element 1870. This may limit the rotation of seat back element 1810 past the full upright (TTOL) position. In a high G-force event, forward movement of weighted element 1870 may cause rotation of trigger ring 1820 in a clockwise direction. When this occurs, there may be a rotational freedom of movement of seat back element 1810, which may allow for the seat back to tilt forward beyond the full upright (TTOL) position.

Figure 17D:
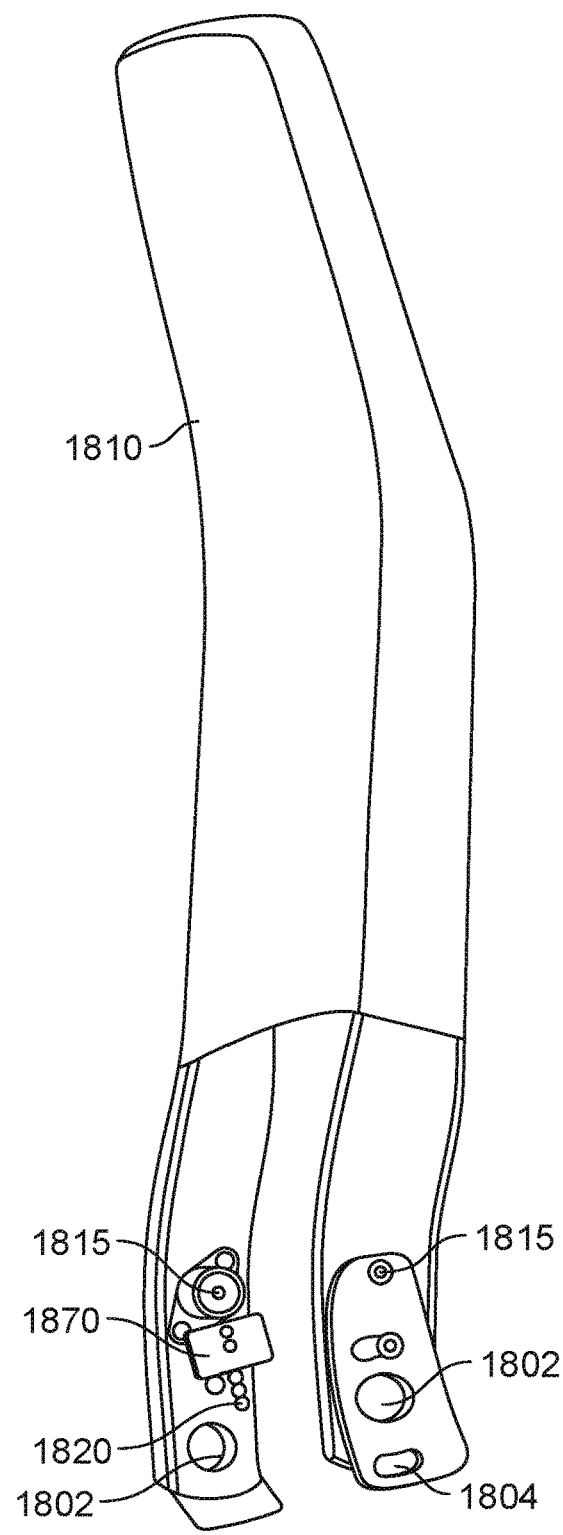
FIG. 17D illustrates a perspective view of a seat back element including the breakover actuation mechanism described in FIGS. 17A-17C.

FIG. 17D illustrate perspective views of the seat back element 1810 including the breakover actuation mechanism described above in FIGS. 17A-17C including shaft 1815, trigger ring 1820 and weighted element 1870. For example, FIG. 17D illustrates a front view the seat back element 1810 that show components of the breakover mechanism and hinge area on both sides of the seat back element 1810 where the seat back element 1810 connects to a seat bottom element, such as seat bottom frame element 105 (FIG. 1). In some implementations, the seat back element 1810 connects to the seat bottom frame element at one or more connection locations such as pivot link 1802 and slot 1804 having complementary features with connection locations on the seat bottom frame element. In some implementations, the weighted element 1870 rotates in response to a high G-force event, which may cause rotation of trigger ring 1820. As discussed above, rotation of the trigger ring 1820 may cause rotational freedom of movement of seat back element 1810, and which may allow for the seat back element 1810 to tilt forward beyond the full upright (TTOL) position.

Figure 18C:
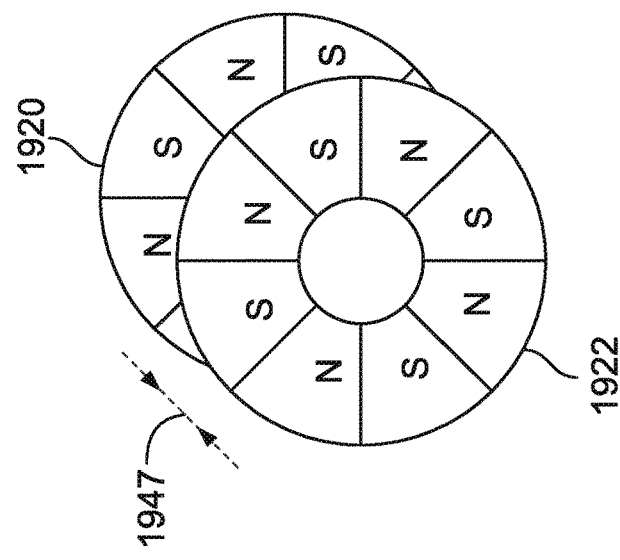
FIGS. 18A through 18C illustrate yet another exemplary implementation of a breakover actuation mechanism for some embodiments of the present disclosure.
Figure 18B:
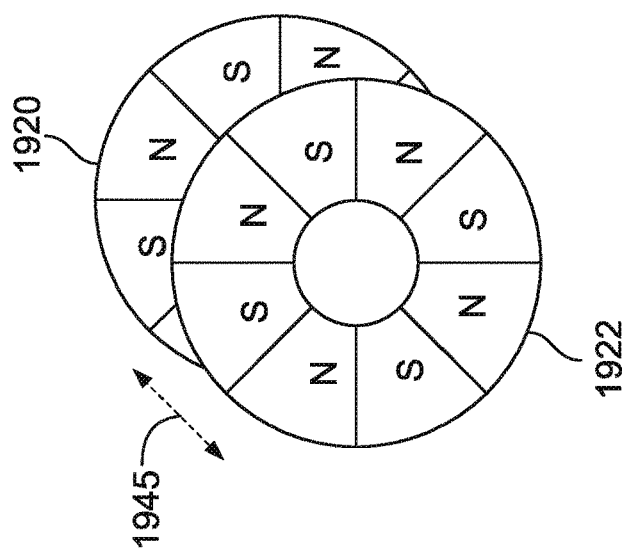
Figure 18A:
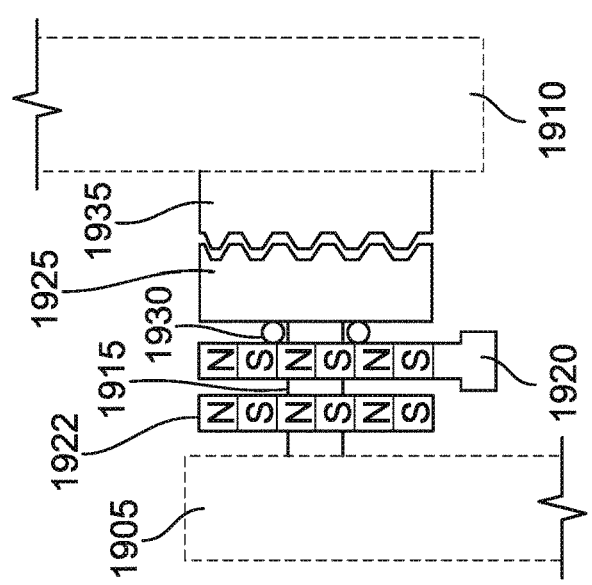

FIGS. 18A, 18B and 18C illustrate another exemplary implementation of a breakover actuation mechanism for the embodiments illustrated in FIGS. 15A and 15B. FIGS. 18A, 18B and 18C each show seat back element 1910, seat bottom frame element 1905, shaft 1915, weighted magnetic trigger ring 1920, magnetic ring 1922, gear ring 1925, one or more balls 1930, gear bushing 1935. In some embodiments, weighted magnetic trigger ring 1920 and magnetic ring 1922 each have an even number of alternating wedge-shaped magnetic domains of alternating polarity. In FIGS. 18B and 18C, weighted magnetic trigger ring 1920 and magnetic ring 1922 each have eight wedge-shaped magnetic domains, but the number of wedge-shaped magnetic domains may be more or less than eight (any even number of domains). Some components of the embodiments illustrated in FIGS. 15A and 15B are not shown for clarity. Under normal operating conditions (FIG. 18B), weighted magnetic trigger ring 1920 is held in a position such that the magnetic domains of the weighted magnetic trigger ring 1920 and magnetic ring 1922 are aligned with like polarities (N-N and S-S). This results is a repulsion force (arrow 1945) between weighted magnetic trigger ring 1920 and magnetic ring 1922, holding gear ring 1925 meshed with gear bushing 1935. In this configuration, the forward rotation of seat back element 1910 is limited to the full upright (TTOL) position. In a high G-force event (FIG. 18C), a weighted portion of weighted magnetic trigger ring 1920 may cause rotation of weighted magnetic trigger ring 1920 in a counterclockwise direction, thereby aligning the opposite polarity magnetic domains (N-S and S-N). This results is an attraction force (arrow 1947) between weighted magnetic trigger ring 1920 and magnetic ring 1922, which may separate gear ring 1925 from gear bushing 1935. When this occurs, there may be a rotational freedom of movement of seat back element 1910, and this may allow for the seat back to tilt forward beyond the full upright (TTOL) position.

FIGS. 19A, 19B and 19C illustrate views of the hinge area (shown as dotted area 115 in FIG. 1) and breakover mechanism of an aircraft passenger seat according to yet another embodiment of the present disclosure. This embodiment may include seat bottom frame element 2005, seat back element 2010, housing 2015, weighted trigger element 2020 (including weight 2022 and one or more posts 2025), plunger mechanism 2030 (including one or more recesses 2035), and spring 2040. In some embodiments, seat back element 2010 may be attached to housing 2015. In some embodiments, the one or more recesses 2035 in plunger mechanism 2030 match the positions of the one or more posts 2025 in weighted trigger element 2020. Under normal operating conditions (FIGS. 19A and 19B), weighted trigger element 2020 may be positioned such that the one or more posts 2025 do not engage into the one or more recesses 2035 in plunger mechanism 2030, and the plunger mechanism 2030 is engaged into link 2045 to prevent the seat back from folding forward of the full upright (TTOL) position. In a high G-force event (FIG. 19C), acceleration may cause the weight 2022 to swing forward, thereby rotating weighted trigger element 2020 and causing the one or more posts 2025 to engage into the one or more recesses 2035 in plunger mechanism 2030. This, in turn, may cause spring 2040 to push plunger mechanism 2030 to disengage from link 2045. When this occurs, there may be a rotational freedom of movement of seat back element 2010, and this may allow for the seat back to tilt forward beyond the full upright (TTOL) position.

Figure 20A:
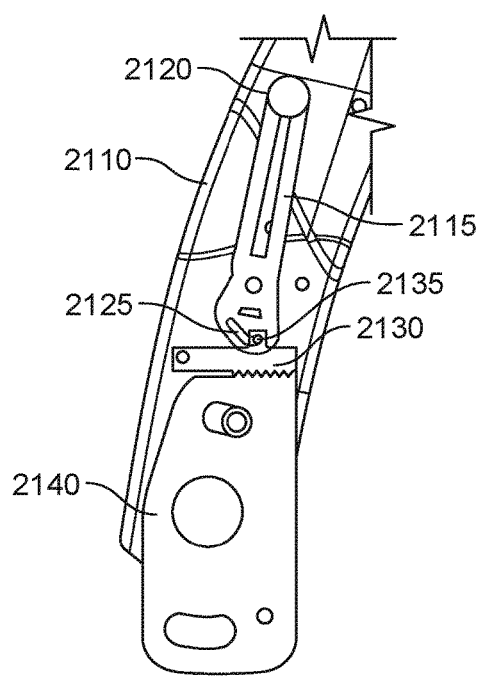
FIGS. 20A and 20B illustrate views of the hinge area and breakover mechanism of an aircraft passenger seat according to yet another embodiment of the present disclosure.
Figure 20B:
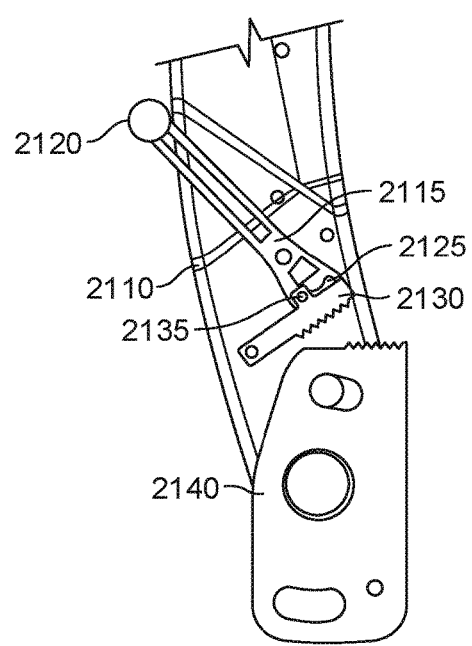

FIGS. 20A and 20B illustrate views of the hinge area (shown as dotted area 115 in FIG. 1) and breakover mechanism of an aircraft passenger seat according to yet another embodiment of the present disclosure. This embodiment may include seat back element 2110, weighted inertia link 2115 (including weight 2120 and slot 2125), gear link 2130 (including shaft 2135) and pivot link 2140. In some embodiments, shaft 2135 of gear link 2130 may be slidably engaged in slot 2125 of weighted inertia link 2115. Under normal operating conditions (FIG. 20A), weighted inertia link 2115 may be positioned such that shaft 2135 of gear link 2130 in engaged at the lower end of slot 2125 of weighted inertia link 2115 such that a gear feature of gear link 2130 is meshed with a complementary gear feature of pivot link 2140, which provides a connection point to a seat bottom frame element, such as the seat bottom frame element 105 (FIG. 1). This may prevent the seat back from folding forward of the full upright (TTOL) position. In a high G-force event (FIG. 20B), acceleration may cause the weight 2120 of weighted inertia link 2115 to swing forward, thereby rotating weighted inertia link 2115 and causing shaft 2135 of gear link 2130 to slide to the upper end of slot 2125 of weighted inertia link 2115 such that the gear feature of gear link 2130 is separated from the complementary gear feature of pivot link 2140 (see FIG. 20B). When the separation of the gear feature of the gear link 2130 from the complementary gear feature of the pivot link 2140 occurs, there may be a rotational freedom of movement of seat back element 2110, which may allow for the seat back element 2110 to tilt forward beyond the full upright (TTOL) position.

Figure 20C:
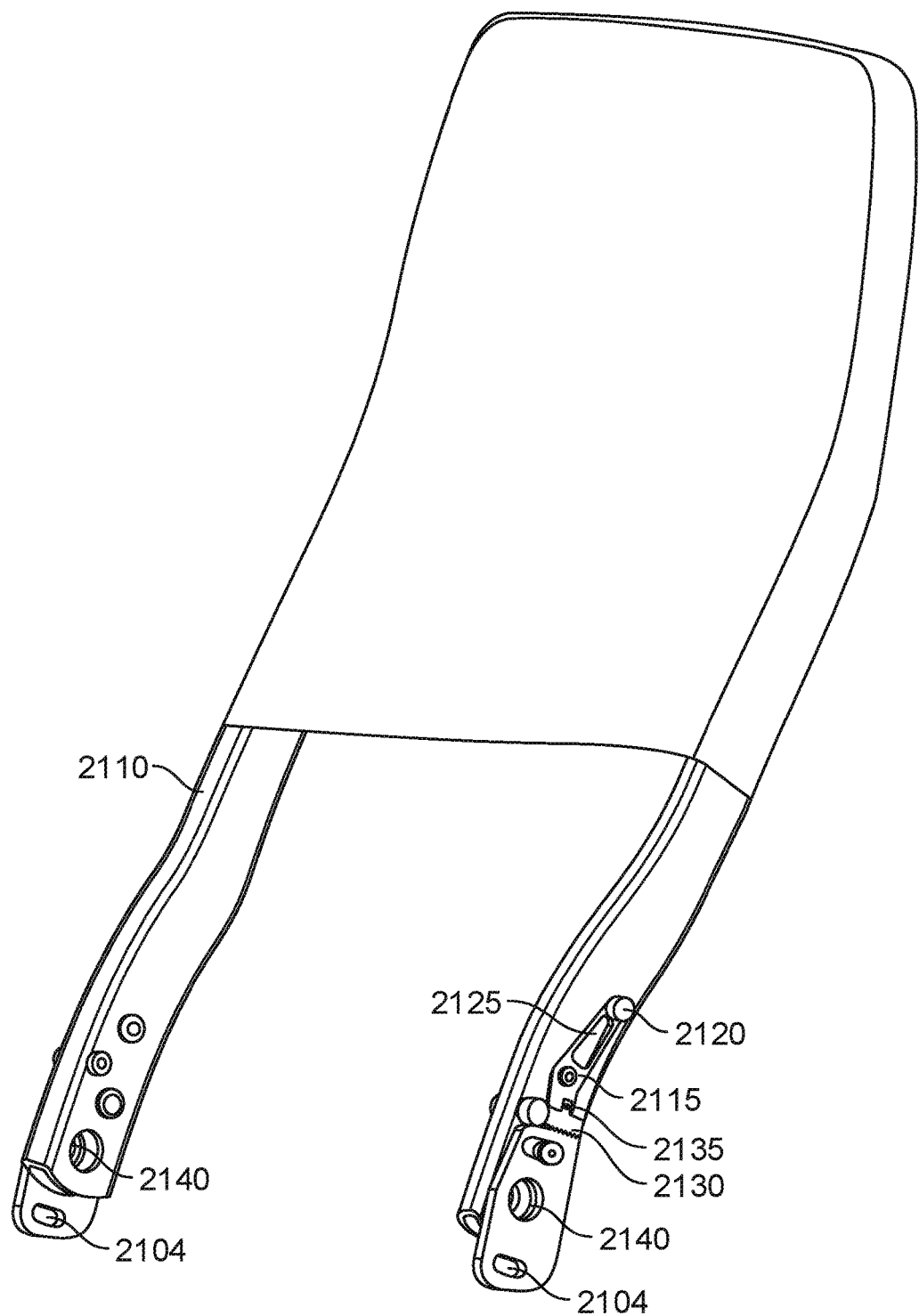
FIG. 20C illustrates another exemplary implementation of a breakover actuation mechanism for some embodiments of the present disclosure.

FIG. 20C illustrates perspective views of the seat back element 2110 including the breakover actuation mechanism described above in FIGS. 20A and 20B including weighted inertia link 2115 (including weight 2120 and slot 2125), gear link 2130 (including shaft 2135), and pivot link 2140. For example, FIG. 21C illustrates a front perspective view of the seat back element 2110 that show components of the breakover mechanism and hinge area during normal operations on both sides of the seat back element 2110 where the seat back element 2110 connects to a seat bottom element, such as seat bottom frame element 105 (FIG. 1). In some implementations, the seat back element 2110 connects to the seat bottom frame element at one or more connection locations such as pivot link 2140 and slot 2104 having complementary features with connection locations on the seat bottom frame element. Under normal operating conditions as shown in FIG. 20C, weighted inertia link 2115 may be positioned such that shaft 2135 of gear link 2130 in engaged at the lower end of slot 2125 of weighted inertia link 2115 such that a gear feature of gear link 2130 is meshed with a complementary gear feature of pivot link 2140, which provides a connection point to a seat bottom frame element, such as the seat bottom frame element 105 (FIG. 1), which may prevent the seat back from folding forward of the full upright (TTOL) position. In a high G-force event (FIG. 20B), acceleration may cause the weight 2120 of weighted inertia link 2115 to swing forward, thereby rotating weighted inertia link 2115 and causing shaft 2135 of gear link 2130 to slide to the upper end of slot 2125 of weighted inertia link 2115 such that the gear feature of gear link 2130 is separated from the complementary gear feature of pivot link 2140 (see FIG. 20B).

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An aircraft passenger seat having a dynamic seat back breakover assembly, comprising:
   a seat bottom frame;
   a seat back pivotally-mounted to the seat bottom frame for permitting an angle of the seat back relative to the seat bottom frame to be varied at least from an upright taxi takeoff and landing (TTOL) position to a reclined position;
   an accelerometer for sensing acceleration corresponding to a force indicative of an emergency event; and
   a breakover mechanism coupled to the seat bottom frame and the seat back, wherein
   the accelerometer is communicatively coupled to an actuator configured to cause actuation of the breakover mechanism in response to a sensed emergency event, and
   the breakover mechanism is configured to
      i) prevent movement of the seat back in a forward direction past the TTOL position toward a passenger seated in the aircraft passenger seat during use, and
      ii) permit forward movement of at least a portion of the seat back in the forward direction past the TTOL position upon activation by the actuator.

2. The aircraft passenger seat of claim 1, wherein the actuator is a solenoid configured to cause decoupling of the seat back from the seat bottom frame in response to the sensed emergency event.

3. The aircraft passenger seat of claim 1, wherein the accelerometer is communicatively coupled to the actuator via at least one of a wired or wireless connection.

4. The aircraft passenger seat of claim 1, wherein the accelerometer is communicatively coupled to actuators for respective breakover mechanisms for a plurality of seats in a grouping of passenger seats such that the accelerometer is configured to cause actuation of the breakover mechanisms for each of the plurality of seats in response to a sensed emergency event.

5. The aircraft passenger seat of claim 1, wherein the breakover mechanism includes a shaft coupled to the actuator, the shaft having a first end affixed to the seat bottom frame and a second end configured to be inserted into a recess in the seat back such that the shaft inserted into the recess is configured to prevent movement of the seat back in the forward direction past the TTOL position.

6. The aircraft passenger seat of claim 5, wherein the actuator is configured to cause retraction of the shaft from the recess in the seat back thereby permitting forward movement of the at least a portion of the seat back in the forward direction past the TTOL position in response to a sensed emergency event.

7. The aircraft passenger seat of claim 6, wherein the breakover mechanism further includes a spring co-axial with the shaft, the spring configured to assist the breakover mechanism in causing the retraction of the shaft from the recess in the seat bottom frame in response to the sensed emergency event by resisting inward motion by the shaft toward the recess.

8. The aircraft passenger seat of claim 7, wherein the breakover mechanism further includes a ball entrapment element coupled to the shaft, the ball entrapment element having a plurality of channels each configured to house a respective ball of a plurality of balls when the shaft is inserted into the recess in the seat back.

9. The aircraft passenger seat of claim 8, wherein the breakover mechanism further includes a collar affixed to the seat back, the collar surrounding the ball entrapment element and configured to house the plurality of balls upon actuation of the breakover mechanism in response to the sensed emergency event.

10. The aircraft passenger seat of claim 9, wherein the retraction of the shaft from the recess in the seatback causes the plurality of balls to fall from each of the plurality of channels of the ball entrapment element into the collar thereby permitting forward movement of the at least a portion of the seat back in the forward direction past the TTOL position.

11. The aircraft passenger seat of claim 7, wherein the breakover mechanism further includes a gear bushing fixedly attached to the seat back having gear teeth configured to engage complementary gear teeth of a gear ring surrounding the shaft to prevent forward movement of the at least a portion of the seat back in the forward direction past the TTOL position.

12. The aircraft passenger seat of claim 11, wherein the breakover mechanism further includes a trigger ring surrounding the shaft, the trigger ring configured to rotate in response to actuation by the accelerometer for sensing acceleration in response to the sensed emergency event, thereby permitting forward motion of the at least a portion of the seat back in the forward direction past the TTOL position.

13. The aircraft passenger seat of claim 1, wherein the breakover mechanism includes a gear latch configured to mesh with a complementary gear feature on the seat back such that the meshing between the gear latch and the complementary gear feature is configured to prevent movement of the seat back in the forward direction past the TTOL position.

14. The aircraft passenger seat of claim 13, wherein the actuator is configured to cause unmeshing of the gear latch from the complementary gear feature on the seat back thereby permitting forward movement of the at least a portion of the seat back in the forward direction past the TTOL position.

15. The aircraft passenger seat of claim 1, wherein the breakover mechanism includes a bracket fixedly attached at a first end to the seat back and pivotally attached at a second end to a recline lock mechanism for the aircraft passenger seat via a fastener, wherein attachment of the second end of the bracket to the recline lock mechanism is configured to prevent movement of the seat back in the forward direction past the TTOL position, wherein the bracket includes a pair of members configured to pivotably attach the bracket to the recline lock mechanism, and wherein the actuator is configured to cause opening of the pair of members thereby causing decoupling of the bracket from the fastener and the recline lock mechanism.

16. An aircraft passenger seat having a dynamic seat back breakover assembly, comprising:
  a seat bottom frame;
  a seat back pivotally-mounted to the seat bottom frame for permitting an angle of the seat back relative to the seat bottom frame to be varied at least from an upright taxi takeoff and landing (TTOL) position to a reclined position;
  an inertial release assembly for sensing acceleration corresponding to a force indicative of an emergency event; and
  a breakover mechanism coupled to the seat bottom frame and the seat back, wherein
  the inertial release assembly is coupled to the breakover mechanism and is configured to rotate in response to a sensed emergency event such that rotation of the inertial release assembly causes decoupling of the seat back from the seat bottom frame, and
  the breakover mechanism is configured to
    i) prevent movement of the seat back in a forward direction past the TTOL position toward a passenger seated in the aircraft passenger seat during use, and
    ii) permit forward movement of at least a portion of the seat back in the forward direction past the TTOL position upon decoupling caused by the inertial release assembly.

17. The aircraft passenger seat of claim 16, wherein the inertial release assembly includes a first end coupled to the breakover mechanism and a second end having a weighted element configured to cause the rotation of the inertial release assembly in response to the sensed emergency event.

* * * * *